United States Patent [19]
Itai

[11] 4,386,381
[45] May 31, 1983

[54] MAGNETIC REPRODUCING APPARATUS

[75] Inventor: Humio Itai, Yokohama, Japan

[73] Assignee: Tokyo Shibaura Denki Kabushiki Kaisha, Kawasaki, Japan

[21] Appl. No.: 180,994

[22] Filed: Aug. 25, 1980

[30] Foreign Application Priority Data

Sep. 14, 1979 [JP] Japan .................................. 54-118077

[51] Int. Cl.³ ............................................. G11B 15/48
[52] U.S. Cl. ..................................... 360/74.2; 360/71; 242/194
[58] Field of Search ..................... 360/74.2, 74.1, 72.1, 360/74.3, 74.4, 74.5–74.7, 71; 242/194

[56] References Cited

U.S. PATENT DOCUMENTS 3,480,230 11/1969 Hosono et al. ....................... 242/194
3,665,117 5/1972 Staar .................................. 360/71 X
4,330,801 5/1982 Morinaga et al. ............. 360/74.4 X Primary Examiner—John H. Wolff
Attorney, Agent, or Firm—Finnegan, Henderson, Farabow, Garrett & Dunner

[57] ABSTRACT

A magnetic reproducing apparatus of the cassette type or the like. The apparatus has a mechanism for automatically changing the tape transportation mode from the fast condition, such as the fast forward or rewind operation of one recorded track of the tape, to the slow condition, such as a playback operation of a different recorded track or a repeating playback operation of the same recorded track. The tape transportation mode is changed in response to a tape stoppage detecting mechanism.

32 Claims, 36 Drawing Figures

F I G. 2
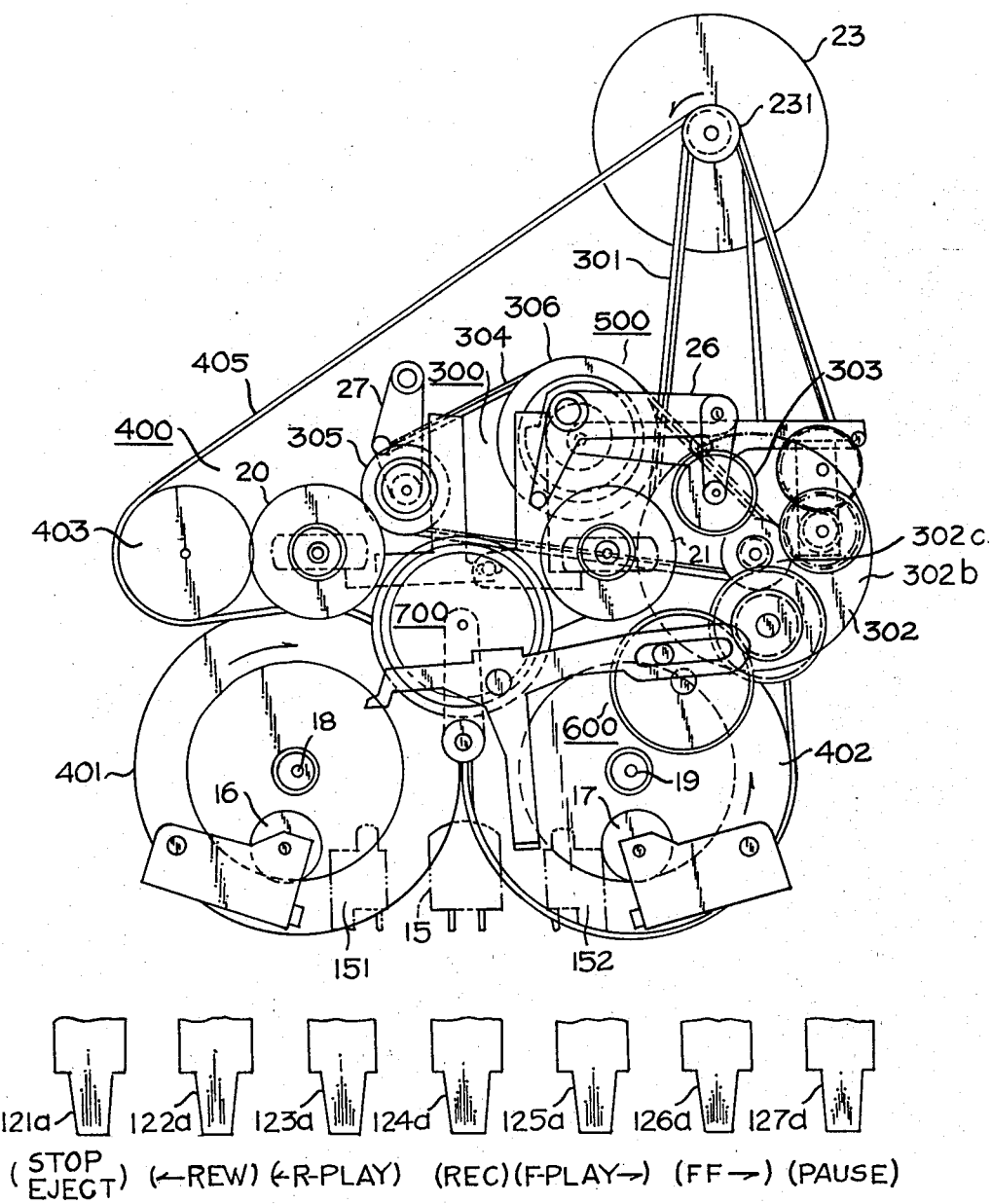

FIG. 3D
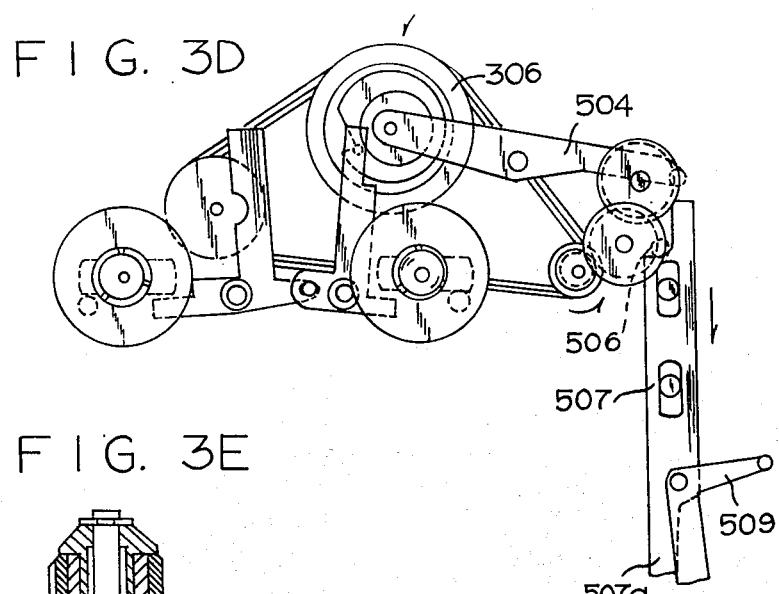
FIG. 3E
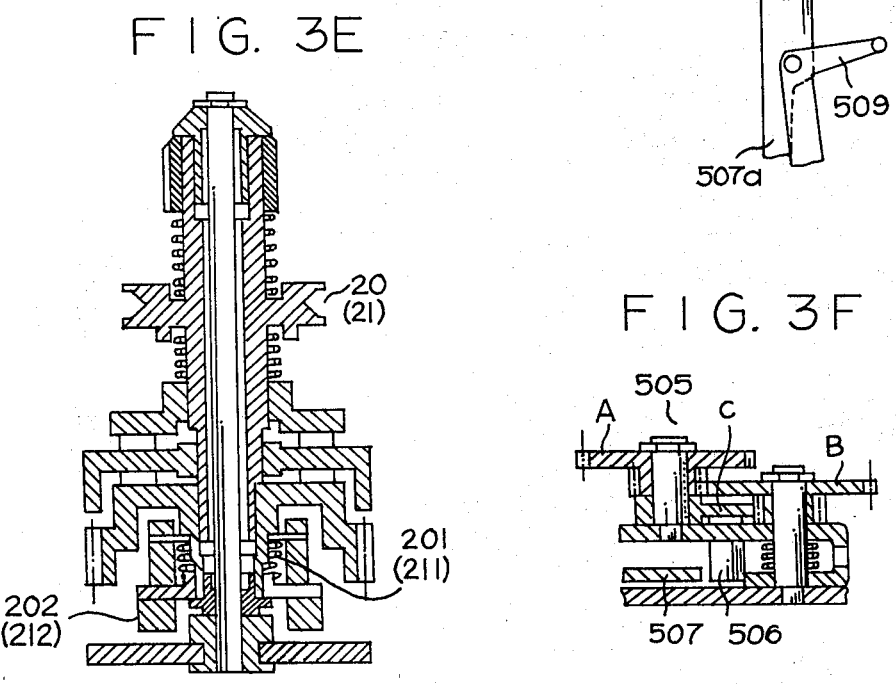
FIG. 3F
FIG. 3G  FIG. 3H  FIG. 3I  FIG. 3J
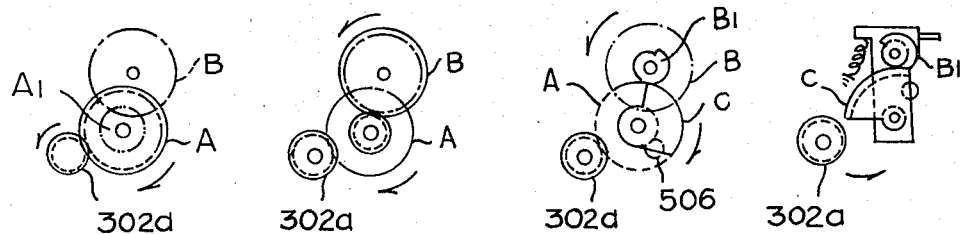

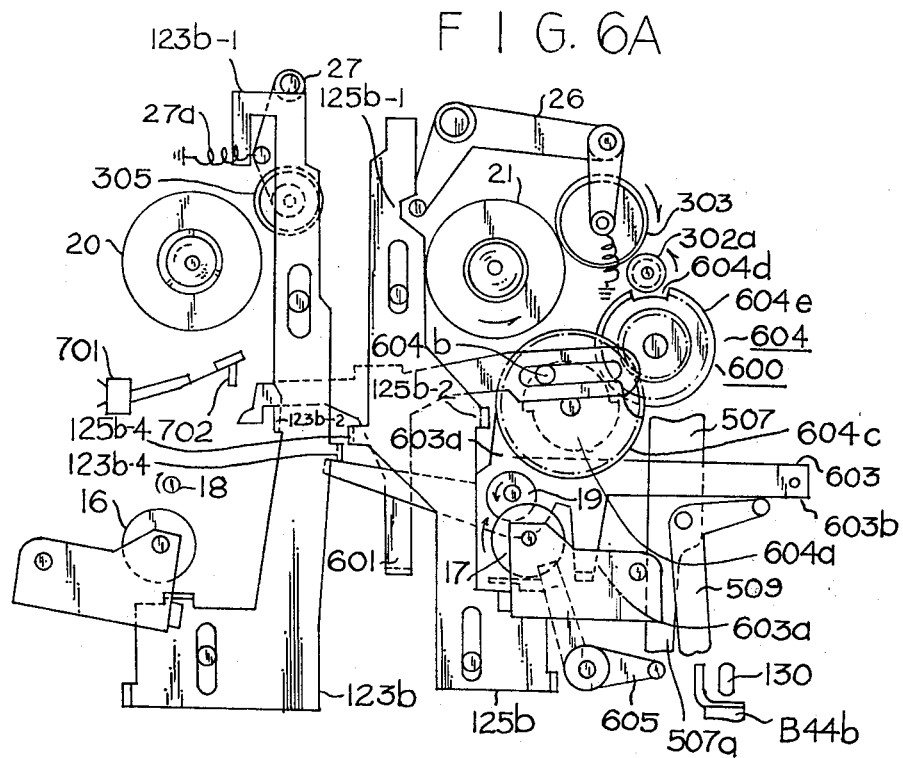
F I G. 6A
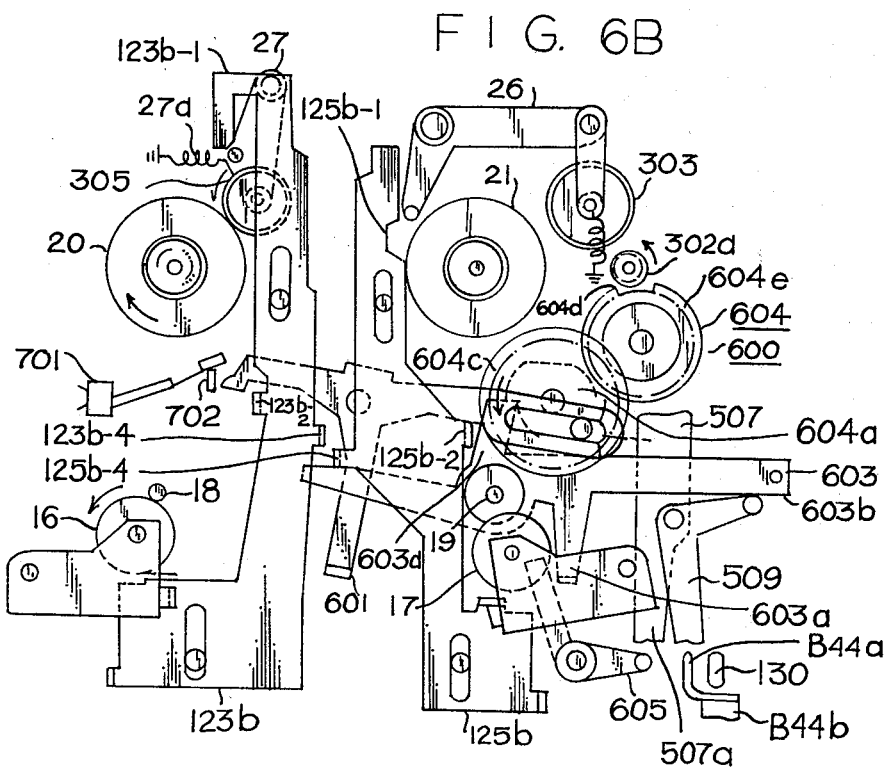
F I G. 6B

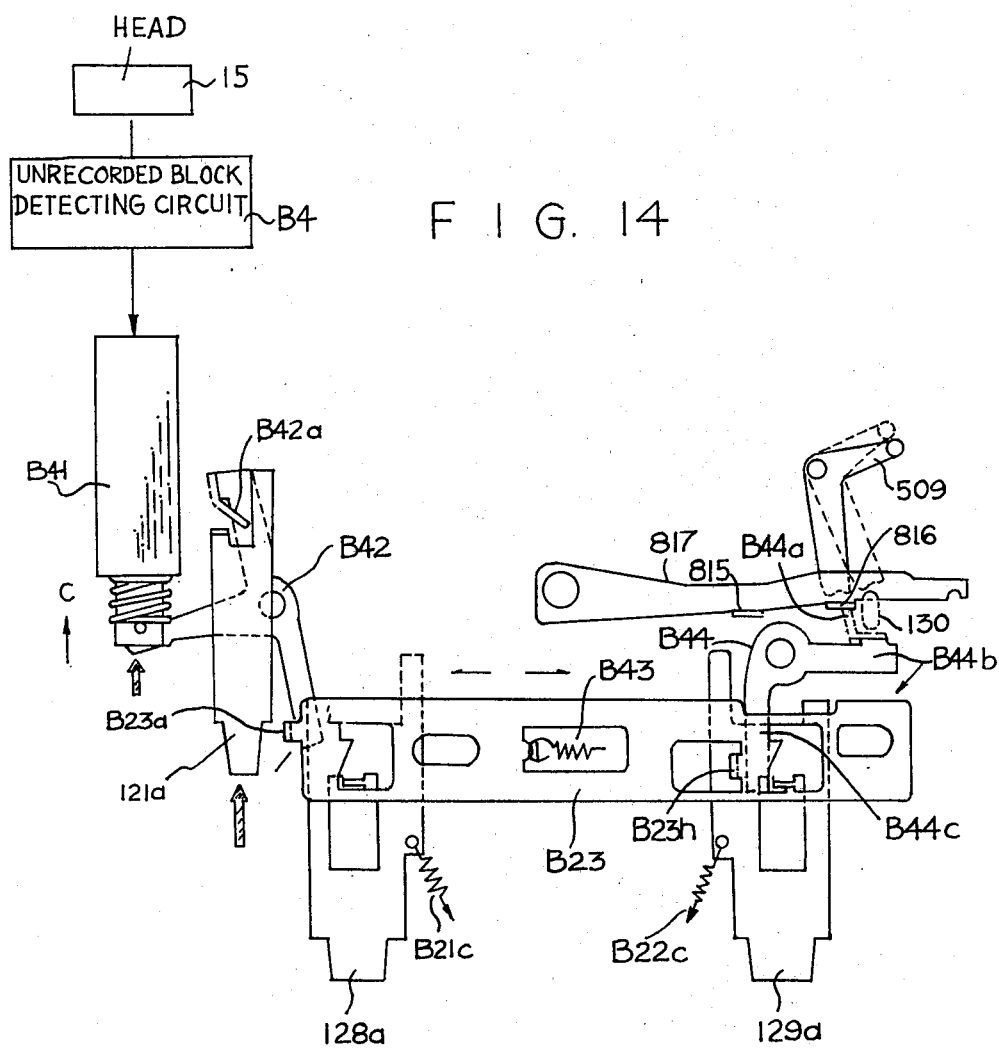

MAGNETIC REPRODUCING APPARATUS

FIELD OF THE INVENTION

This invention relates to a magnetic reproducing apparatus of the cassette type or the like, and more specifically to a magnetic reproducing apparatus with a mechanism for automatically changing the tape transporting mode from the fast condition, such as the fast forward or rewind operation of one recorded track, to the slow condition, such as a playback operation of a different recorded track or a repeating playback operation of the same recorded track.

BACKGROUND OF THE INVENTION

It is desirable for a magnetic reproducing apparatus to perform various functions, such as a recording block quick select function and an automatic operation changing from fast forwarding operation of one recorded track of the magnetic tape to reverse reproducing operation of different recorded tracks of the tape.

The functions of such a magnetic reproducing apparatus may be electronically (electrically) or mechanically controlled, but both cases have some advantages and disadvantages. An electronic (electric) control system would require many motors or solenoid plungers resulting in disadvantages, because the power consumption unnecessarily increases, the size and weight become greater, and the maufacturing cost becomes higher. If economical efficiency is to be considered, a mechanical control system is better because lower power consumption is maintained and compactness in size and lightness in weight may be attained. However, a mechanical type magnetic reproducing apparatus is not desirable if it involves a complex mechanism or operation. It is desired that the magnetic reproducing apparatus be simple in construction and easy to operate.

In order to perform such an automatic changing function of a tape transport condition mechanically, this invention provides an improved mechanism which is simple in construction, suitable for multi-functional purposes, and easy to operate.

In an aspect of the present invention there is provided a magnetic tape reproducing apparatus comprising: (a) a pair of spindles to which a pair of reels of a cassette tape is removably attached; (b) fast-driving means for selectively driving one of the spindles in one direction such that one of the reels held on the one spindle winds up a tape from the other reel; (c) means for detecting stoppage of the tape running between the reels; (d) slow-driving means for driving the other spindle in the other direction so that the other reel held on the other spindle winds up the tape supplied from the one reel; (e) means for releasing the fast-driving means from the operating condition and setting the slow-driving means in operating condition in response to the detecting means; (f) means for changing the operating direction of the slow-driving means for driving the respective spindles in opposite directions; and (g) means for operating the changing means in response to the detecting means for causing the slow-driving means to drive the spindle in a different direction from the spindle driven by the fast-driving means before stoppage of the tape.

Additional objects and advantages of the present invention will become apparent to persons skilled in the art from a study of the following description and the accompanying drawings, in which:

BRIEF DESCRIPTION OF THE DRAWINGS

FIG. 2 is a plan view of part of the magnetic reproducing apparatus of FIG. 1 excepting the main chassis;

FIGS. 3A to 3J show an automatic tape stop detecting mechanism section of the magnetic reproducing apparatus, wherein FIGS. 3A to 3D are plan views showing varied states of the mechanism section, FIG. 3E is a sectional view showing a reel holder and a friction plate, FIG. 3F is a sectional view of a gear mechanism, and FIGS. 3G to 3J are plan views showing varied positions of the gear mechanism;

FIGS. 6A and 6B are plan views showing varied operating states of an automatic reverse driving section of the magnetic reproducing apparatus;

FIG. 14 is a plan view showing a releasing mechanism section for a lock plate in FIG. 13.

DETAILED DESCRIPTION OF THE PREFERRED EMBODIMENT

An embodiment of the present invention has an automatically reciprocative reproducing mechanism and an automatic tape transportation speed changing mechanism for switching the tape speed from fast transportation speed condition to slow transportation speed condition.

Figure 1:
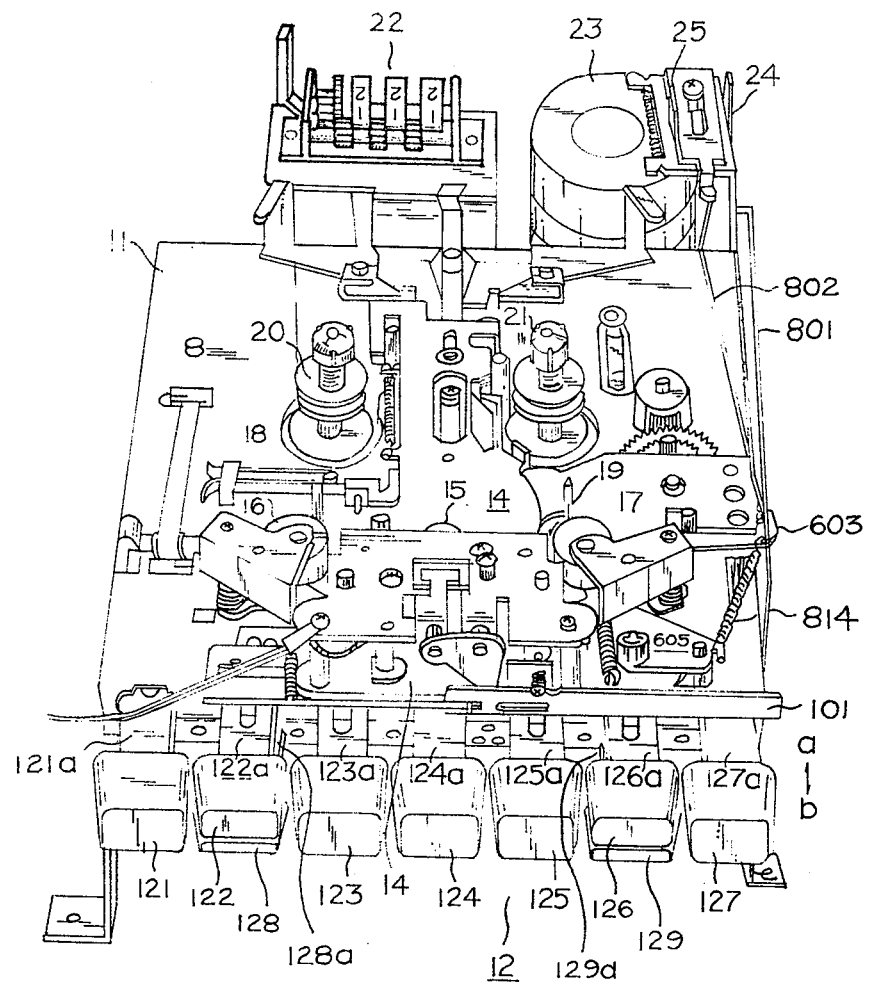
FIG. 1 is a perspective view of a magnetic reproducing apparatus according to an embodiment of this invention.

FIG. 1 is a perspective view of a magnetic reproducing apparatus having a substantially U-shaped main chassis 11 which is provided with various mechanisms as mentioned later at its longitudinal and transverse portions. There is a control section 12 protruding downward as illustrated, including the following: a STOP button 121 for stopping and ejection, a REW button 122 for rewinding, a R-PLAY button 123 for reverse playback or sound reproduction (returning operation), a REC button 124 for recording, an F-PLAY button 125 for forward playback (going operation), an FF button 126 for fast forwarding, a PAUSE button 127 for pausing, an R-SEARCH button 128 for searching backward an unrecorded block, and an F-SEARCH button 129 for searching forward an unrecorded block. The above described buttons 121–129 are arranged from left to right as illustrated so that they may be depressed and restored in the directions of arrows a and b. By pushing these buttons 121 to 129, driving systems as mentioned later may be allowed to operate by means of their corresponding control rods 121a to 129a.

These control rods 121a to 129a are so arranged as to slide reciprocatively in the directions of arrows a and b under the chassis 11. The rods 122a to 129a, when pressed down, are to be locked to their respective depressed positions, engaging with lock mechanisms mentioned later. Only the rod 121a of STOP button 121 will never be locked. Rod 121a engages with the lock mechanisms so as to release the other control rods from the locked positions. PAUSE button 127 and its rod 127a, however, operate independently without engaging with the lock mechanisms, and engage with a known push-push mechanism (not shown) disposed below the PLAY button. A magnetic reproducing apparatus such as this invention which is capable of automatically changing a tape-driving operation from a condition of searching backwardly or forwardly for an unrecorded portion of any track of the tape in fast speed, to a condition of reproducing on the same track (or another track upon reaching the tape end), should be provided with two independent PLAY buttons for forward and reverse reproducing operations and two independent SEARCH buttons for forward and reverse searching operations.

When both PLAY buttons and one of the SEARCH buttons are operated, the above-mentioned function is achieved. Further, if only one of these two PLAY buttons 123 and 125 is pushed, playback or recording will be allowed only in its corresponding direction. If both PLAY buttons are pushed at the same time, then automatic reverse operation will be performed. Normal playback or recording may be achieved by operating only F-PLAY button 125 for the forward operation.

Moreover, REC button 124, when pushed in combination with the aforesaid one or two PLAY buttons 123 and 125, drives a recording system by means of its corresponding rod 124a so as to enable one-way recording in the forward or reverse direction or reciprocative recording by automatic reverse. In this case, a different mechanism from an ordinary one is used for the prevention of wrong erasure to comply with any recording conditions, which will be mentioned afterwards.

In FIG. 1, left and right reel holders or pedestals 20 and 21 protrude at a fixed space in the central portion of chassis 11. These holders 20 and 21 are respectively coupled to an automatic tape stoppage detecting mechanism and a reciprocation switching mechanism as mentioned later. At the top of the drawing of FIG. 1, there are shown a tape counter 22 coupled to left reel holder 20, a motor 23 as a power source for the driving systems, and control switches 24 and 25 for an automatic reverse frequency limiting mechanism and a manual reverse mechanism as described below.

FIG. 2 is an overall plan view of the tape driving mechanism of FIG. 1, with main chassis 11 removed therefrom to serve the convenience of explanation. This mechanism is particularly characterized in that a reel driving system 300 is independent of a capstan driving system 400 in a normal-speed driving mechanism section.

Accordingly, the capstans are not subject to any direct influence of load fluctuations, so that WOW and other characteristics may be improved. In addition, a detecting portion of an automatic tape stop detecting mechanism 500 may be simplified by incorporating it into the same system with normal-speed reel driving system 300. Namely, a motor pulley 231 mounted on the rotating shaft of motor 23 is coupled with a large-diameter portion 302b of a central pulley 302 by means of a first belt 301. A right take-up idler 303 is arranged so that it can touch and go away from a small-diameter portion 302c of central pulley 302. As described afterwards, right take-up idler 303 can also touch and go away from right reel holder 21 simultaneously with the small-diameter portion 302c of central pulley 302 by means of a link mechanism 26 driven by a right reproducing slider 125b which is coupled to rod 125a of F-PLAY button 125 during rightward feed.

Around the small-diameter portion of central pulley 302 is a second belt 304 forming a substantially triangular loop with such small-diameter portion 302c as one base angle portion of the triangle. Belt 304 is further stretched between a left take-up pulley 305 located at the other base angle portion of the triangle opposite to central pulley 302 and a cam wheel 306 disposed at the vertical angle portion. Left take-up pulley 305 is allowed to touch and go away from the left reel holder 20 by means of a control member 27 driven by a left reproducing slider 123b which is coupled to the rod 123a of the R-PLAY button 123 during leftward feed, as described hereinafter (FIG. 4A). Cam wheel 306 constitutes the detecting portion of automatic tape stop detecting mechanism 500 which can, in this case, detect the stop of both left and right reel holders 20 and 21. This will later be described further in detail.

Furthermore, in FIG. 2, capstan driving system 400 comprises a pair of left and right flywheels 401 and 402 coupled in the so-called anti-rolling manner by means of a third belt 405 through motor pulley 231 and a guide pulley 403 for flywheels 401 and 402. A pair of left and right capstans 18 and 19, as aforesaid, protrude coaxially from the centers of their corresponding flywheels 401 and 402. A forward-reverse switching mechanism 600 of the normal-speed tape feed system and a forward-reverse switching mechanism 700 of the high-speed tape feed system as shown in FIG. 2 will later be described in detail.

Besides the aforesaid improvement of WOW characteristic, such normal-speed driving mechanism allows stable transmission of rotation to be attained because the reel holder's bi-directional drive can be performed on the intrusion side, and motor 23 need not be rotated in the reverse direction. This obviously leads to reduced cost and prolonged life.

As may be seen from the above-described construction, the magnetic reproducing apparatus of this invention can perform tape feed in both directions to achieve automatic reverse operation, in addition to the ordinary function of a magnetic reproducing apparatus. Such ordinary function, of which description will be limited to the essential minimum, may easily be understood from the explanation of the automatic reverse operation. Emphasis will, therefore, be laid on the automatic reverse in the description hereinafter. To begin with, automatic tape stoppage detecting mechanism 500 will now be described. This is to be done because it is more convenient first to explain detection of a tape end by the detecting portion of automatic tape stoppage detecting mechanism 500, since the automatic reverse operation automatically switches the direction of tape running by detecting the tape end, as is generally known.

Figure 3A:
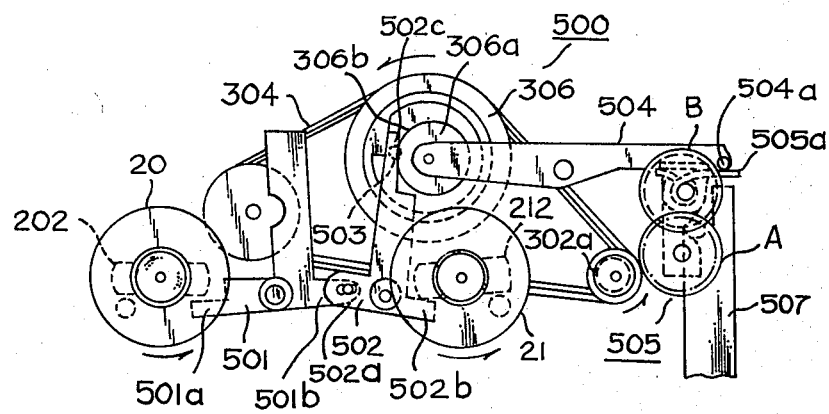
Figure 3B:
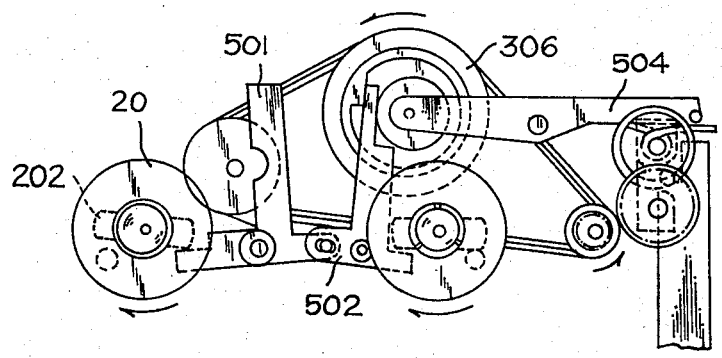
Figure 3C:
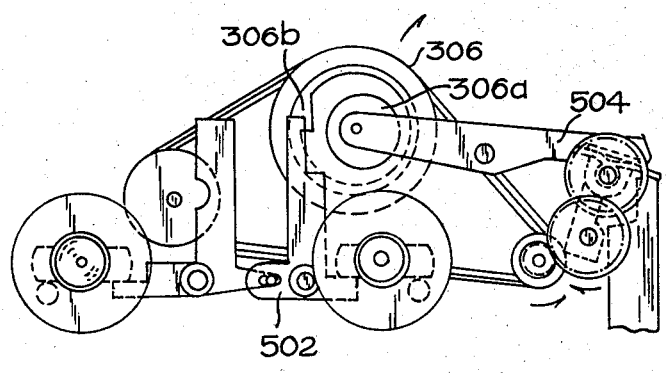

Now let it be supposed that the tape is running to the right or left (where the magnetic reproducing apparatus is set to any other operating state than the automatic reverse operation which will be mentioned later). In this condition, automatic tape stoppage detecting mechanism 500 is in a position as shown in FIG. 3A or 3B. That is, friction mechanisms 201 and 211 are provided at the respective lower portions of left and right reel holders 20 and 21, as shown in FIG. 3E. Further, as shown in FIG. 3A, respective ends 501a and 502b of the bases of left and right substantially T-shaped detection levers 501 and 502 engage with friction plates 202 and 212 of friction mechanism 201 and 211, while the respective opposite ends 501b and 502a of the bases of the plates 202 and 212 are coupled to each other with a play left, the central portions of the bases being pivotally attached. In the remaining end 502c of the right detection lever 502, there is downwardly embedded a trace pin 503 which engages with and is guided by an inside eccentric cam portion 306a of cam wheel 306. Thus, when the tape is running to the right (FIG. 3A), clockwise biasing force is always applied to right detection lever 502 which engages with friction plate 212, accompanying counterclockwise rotation of right reel holder 21 as indicated by an arrow in FIG. 3A. In consequence, while the tape is running to the right, right detection lever 502 is being swung clockwise and counterclockwise around its pivotal point within a narrow range by trace pin 503 guided by inside eccentric cam portion 306a of cam wheel 306. When the tape end is reached in this state and right reel holder 21 is stopped, the clockwise biasing force is removed from right detection lever 502, so that detection lever 502 stops at a position where it is thrust away in the counterclockwise direction by cam portion 306a, as shown in FIG. 3c. Then, detection lever 502 engages with an outside projection 306b of cam wheel 306, which rotates independently of the tape run.

Since center cam wheel 306 is pivotally mounted on one end of a cam lever 504, cam wheel 306 itself comes to rock clockwise as illustrated around a pivotal pin 504a in the center of lever 504 in the manner of the so-called planetary motion, by its own turning effort. Thus, a gear mechanism 505, which engages with the other end of cam lever 504 through a torsion spring 505a, engages with a gear 302a coaxial with the small-diameter portion 302c of central pulley 302. Gear 302a is directly connected to motor 23 to be the driving source for the so-called automatic tape stop detecting operation. FIGS. 3F to 3J show how gear 302a engages with gear mechanism 505, as well as their respective functions.

Gear mechanism 505 engaging with cam lever 504 is composed of gears A, B and C, among which gear A engages with central pulley gear 302a to receive the turning force. Then, gear B rotates through a small gear A1 coaxial and integral with gear A, so that fan-shaped gear C rotates through a small gear B1 coaxial and integral with gear B. As a result, a pin 506 attached to fan-shaped gear C moves a releasing slider 507 downward as shown in FIG. 3D with a force by which gear C is finally rocked clockwise, thereby releasing the control rods which have been locked by the lock mechanism, and shutting-off the magnetic reproducing apparatus or switching the directions of tape feed for automatic reverse operation.

Thus, the automatic tape stop detecting operation is achieved. In the aforementioned processes, cam lever 504 is rocked in the clockwise direction and stops at a position where pin 504a at the right-end portion of cam lever 504 butts against releasing slider 507, so that cam wheel 306 is on stand-by-state, slipping on belt 304 (FIG. 3C). When releasing slider 507 starts to move in the aforesaid manner (this is caused by a time lag in operation attributable to the small gear of gear B being a notched gear), cam lever 504 is further rocked clockwise, so that cam wheel 306 rocks in the same direction. As a result, the engaging surface of outside projection 306b of cam wheel 306 is inclined against trace pin 503, so that trace pin 503 moves along the engaging surface automatically to quit projection 306b. Accordingly, cam wheel 306 rocks counterclockwise around pivot point 504a of lever 504 by its own turning force to return to its original position (FIG. 3D).

When the tape is running to the left (FIG. 3B), a counterclockwise biasing force is always applied to left detecting lever 501 which engages with friction plate 202, thereby causing clockwise rotation of left reel holder 20 as indicated by an arrow in FIG. 3B. Accordingly, the one end of the base of right detection lever 502, which is coupled with a play left in the aforesaid rightward running, is coupled in place, and finally, the same clockwise biasing force of the case is continually applied to right detection lever 502. Thus, after this, the operations for the rightward tape run are followed to achieve automatic tape stop detecting operation.

According to such automatic tape stop detecting mechanism 500, right detection lever 502 and cam wheel 306 may automatically be released from their reciprocal engagement by the turning force of cam wheel 306, so that there is no need for a member for releasing the engagement, as has been essential to this type of automatic tape stop detecting mechanism in the prior art. Moreover, the driving source and detection lever for the automatic tape stop detecting operation may freely be arranged, and the detection lever may be axially fixed, improving accuracy and stability of operation. Since cam wheel 306, forming the detecting portion, is rotated by normal-speed reel driving system 300 and a single belt, stoppages of both left and right reel holders 20 and 21 may be detected in common, serving the convenience of the simplification of construction and improvement with respect to the space factor.

The above description has been given on the assumption that the automatic tape stop detecting operation is performed only when the tape end is reached, though the same operation may be performed also when the tape has become entangled, thereby protecting the tape and various mechanical portions.

Now there will be described an automatically reciprocative reproducing mechanism portion used in this embodiment.

As is generally known, systems for magnetic reproducing apparatus capable of reciprocative recording or reproducing are called automatic reverse systems. These automatic reverse systems can automatically continue recording or reproducing for a reverse operation without changing the states of tape loading and setting of a control section when the end of a tape is reached in a forward operation, providing special facility for prolonged recording or playback.

Figure 4:
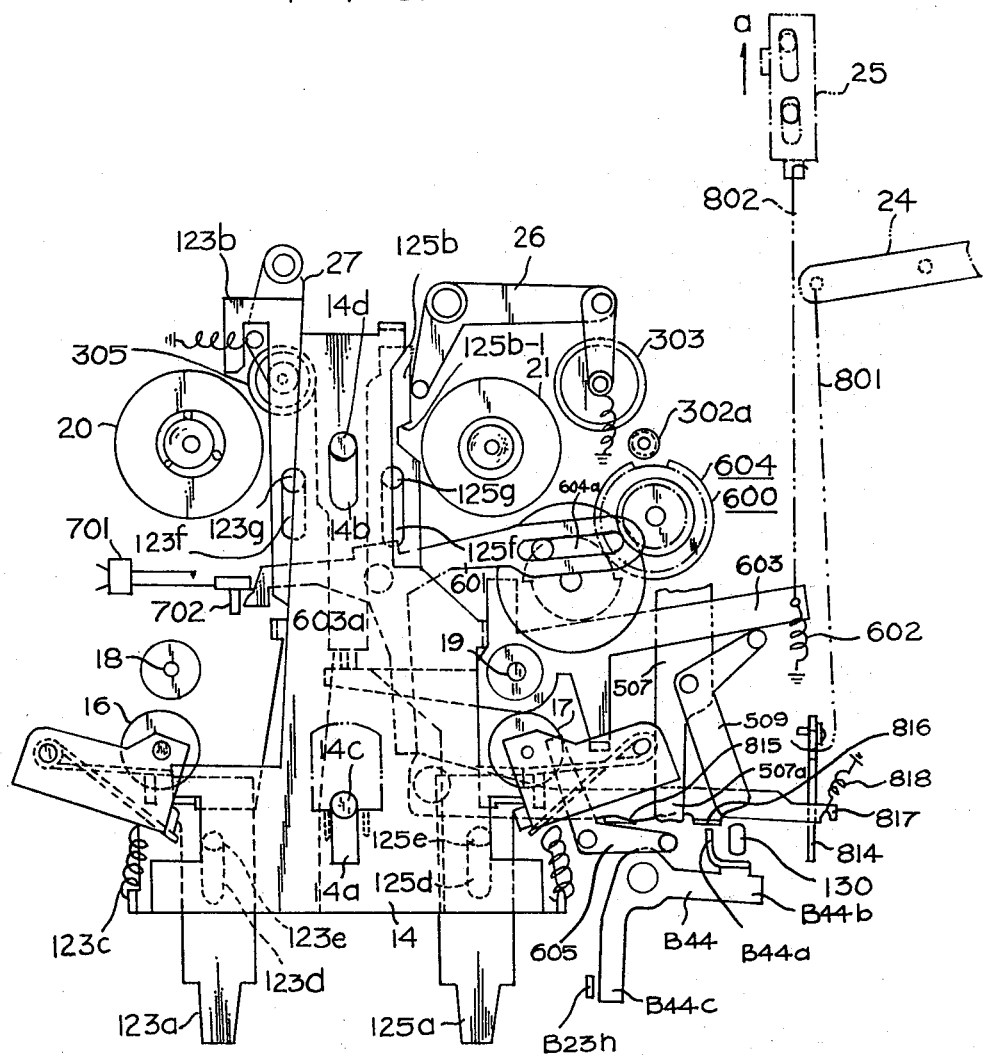
FIG. 4 is a plan view showing an automatic reverse driving section of the magnetic reproducing apparatus.

FIG. 4 shows the automatic reverse driving system extracted from the drawings of FIGS. 1 and 2. Control rods 123a and 125a for the reverse and forward playback operations are engaged, respectively, with pinch rollers 16 and 17, and left and right reproducing sliders 123b and 125b for controlling right take-up idler 303 and a head slider 14, by means of springs 123c and 125c. Hereupon, rods 123a and 125a are allowed to slide reciprocatively in the directions of arrows a and b by guide pins 123e and 125e engaging with slots 123d and 125d as shown in FIG. 4 (same applies to other levers not shown). Also, head slider 14 and left and right reproducing sliders 123b and 125b are allowed to slide reciprocatively in the directions of arrows a and b by means of engagement of guide pins 14c, 14d, for head slider 14, and 123g and 125g for reproducing sliders 123b and 125b with their corresponding slots 14a, 14b, 123f and 125f.

By the engagement with springs 123c and 125c, head slider 41 can be brought into its operating state, thereby bringing left or right slider 125b or 123b into the driving state, when either reproducing rod 125a or 123a is operated.

Figure 5A:
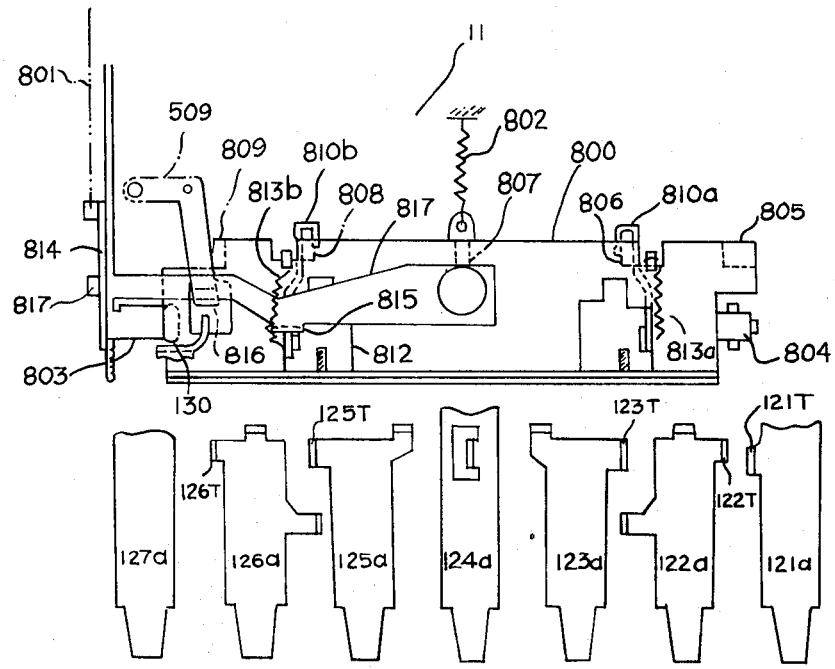
FIG. 5A is a plan view showing a locking mechanism section for control rods except SEARCH rods, and a switching mechanism section of reverse frequency.
Figure 5B:
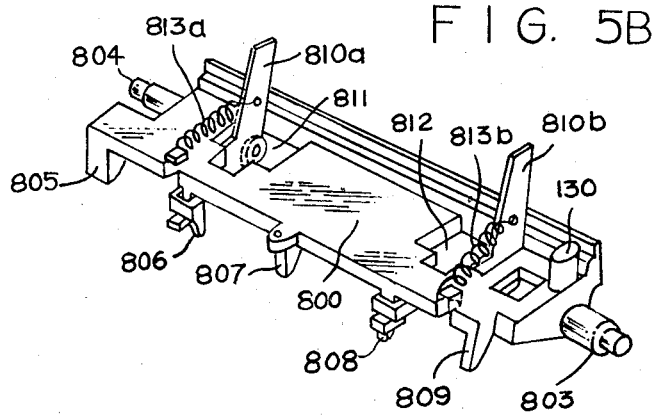
FIG. 5B is a perspective view showing a lock plate in FIG. 5A.

Now there will be described the lock mechanism of control section 12 for applying above-mentioned function. FIGS. 5A and 5B show the lock mechanism portion hidden under chassis 11 in FIG. 1. A lock plate 800 is rockably mounted on chassis 11 by shafts 803 and 804 of its both sides. Lock plate 800 has five lock portions 805 to 809 protruding toward chassis 11 from one end of lock plate 800 in a line, and the end of lock plate 800 is biased in the direction toward chassis 11 by means of a spring 802. Three of the lock portions 805, 807 and 809 are in a body with lock plate 800, but the remaining two lock positions 806 and 808 are formed at one end of L-shaped levers 810a and 810b, each rockably mounted on lock plate 800. Lock portions 805 to 809 are engagable with respective projections 122T to 126T of control rods 122a to 126a. Hereupon, three lock portions 806, 808, and 807 for locking R-PLAY and F-PLAY control rods 123a and 125a and REC control rod 124a protrude further than other lock portions 805 and 809 for locking REW and FF control buttons 122 and 126. Lock portions 806 and 808 are independently rockable in a direction opposite to chassis 11 against the biasing forces of springs 813 and 814 connected between the one end of lock plate 800 and other end of L-shaped levers 813 and 814. Therefore, the lock mechanism of control section 12 used with this type of magnetic reproducing apparatus allows both control rods 123a and 125a to be locked together, either at the same time the other control rod is locked or after a time lag. Moreover, control rod 124 for recording can be locked together with rods 123a and 125a. On the other hand, when one or both of control rods 123a and 125b are locked to lock plate 800, REW and FF control rods 122a and 126a are prevented from engaging with lock plate 800. In order to release either rod 122a or 126a from its locking condition, not only STOP control rod 121a but also either R-PLAY control rod 123a or F-PLAY control rod 125a may be operated. In addition, rod 122a may be operated to release rod 126a, and rod 126a may be operated to release rod 122a. STOP control rod 121a has a projection 121T longer than other rods. Therefore, projection 121T may rock lock plate 800 in a large angle causing STOP control rod 121 to release all of other rods from their locking condition.

In above FIG. 5a, control rods 121a to 127a are shown as being separated from lock plate 800, for the sake of convenience and ease of understanding. But, the rods are placed between chassis 11 and lock plate 800 in the actual apparatus.

Thus, if R-PLAY and F-PLAY control rods 123a and 125a are locked substantially simultaneously by depressing both PLAY buttons 123 and 125 for automatic reverse (playback) operation, both left and right reproducing sliders 123b and 125b will tend to enter into the drive mode, as shown in FIG. 4. Then, sliders 123b and 125b hit against a substantially T-shaped reverse driving lever 601 which is rockably disposed between those sliders 123b and 125b; one of sliders 123b and 125b is prevented from entry placing it in stand-by-state, while the other is allowed to enter for playback in its corresponding direction.

Now let us suppose a case of playback operation in the rightward or forward direction, as shown in FIG. 6A (the forward-reverse switching mechanism 600 of the normal-speed tape feed system is so set as to give priority to the forward operation when the R-PLAY and F-PLAY buttons 123 and 125 are operated at the same time, for a reason mentioned later). In this state, a gear lock lever 603 is continually given clockwise biasing force by a tension spring 602 (FIG. 4) connected to one end thereof and pivotally supported at its substantially central portion coaxially with capstan 19. The gear lock lever 603 is rocked clockwise in engaging with one of downward strips 123b-4 and 125b-4 of left and right reproducing sliders 123b and 125b by the penetration of sliders 123b and 125b, in this case. Then, top projection 603a of gear lock lever 603 enters into engagement with a cam portion 604a of a reverse gear mechanism 604 as mentioned later, thereby maintaining reverse driving lever 601 in a position as illustrated (hereinafter referred to as first position), and preventing penetration of left reproducing slider 123b by engaging with a downward strip 123b-4 of slider 123b. Lever 601 cooperates with gear mechanism 604 in such manner as mentioned later. At this time, one end of link mechanism 26 is caused by the urging force of a spring to fall in a recess 125b-1 formed in the upper lateral face of right reproducing slider 125b. Slider 125b has been allowed to penetrate, so that right take-up slider 303 pivotally mounted on the other end of mechanism 26 rocks in the clockwise direction to come into contact with the small-diameter portion of central pulley 302 and right reel holder 21, thereby performing the rightward or forward playback. Gear lock lever 603 further rocks a select lever 509 at a place not facing lock plate releasing portion 130 protruding from lock plate 800 (FIGS. 5A and 5B). (This applies also to a case of 1-reciprocation automatic reverse operation as mentioned later).

When the tape end is reached in such forward playback state, the detecting portion of automatic tape stop detecting mechanism 500 operates in the aforementioned manner. In this state, a bottom end 507a of releasing slider 507 rocks one end of reverse lever 605 in clockwise direction, and the other end of reverse lever 605 becomes engaged with a downwardly projecting end 603c to rock lever 603 counterclockwise. This causes an upwardly projecting end 603a of gear lock lever 603 to be released from the engaging state with cam portion 604a of reverse gear mechanism 604, thereby shifting reverse driving lever 601 to a position as shown in FIG. 6B (hereinafter referred to as second position). Lever 601 cooperates with gear mechanism 604 in such a manner as mentioned below.

Figure 7A:
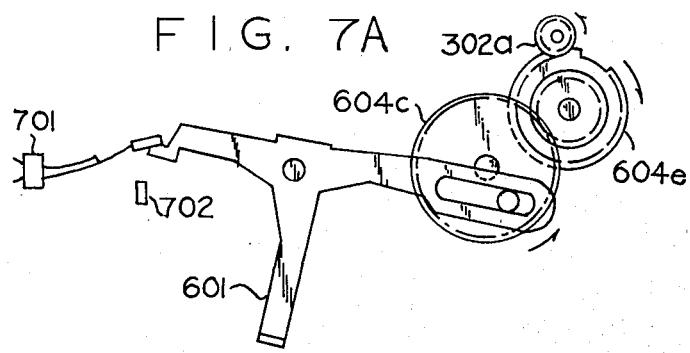
FIGS. 7A and 7B are plan views showing varied operating states of a normal-speed forward-reverse switching mechanism section of the magnetic reproducing apparatus.
Figure 7B:
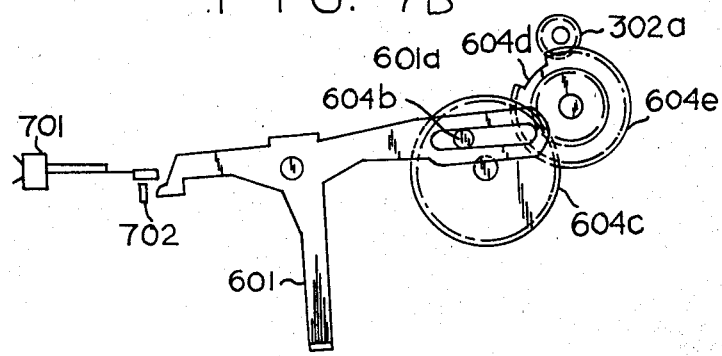

Now there will be described the cooperative relation between reverse driving lever 601 and reverse gear mechanism 604. Reverse gear mechanism 604 is composed of a pin 604b engaging a slot 601a formed at the right end of reverse driving lever 601, a first gear 604c having cam portion 604a, and a second gear 604e coaxial and integral with a small gear engaging gear 604c and having a notch 604d at a portion of its outer periphery. Usually (including a case where the reverse driving lever 601 is in the first or second position for playback in a fixed direction), notch 604d of second gear 604e faces central pulley gear 302a, two gears 604e and 302a not engaging with each other. When the tape end is reached to release gear lock lever 603 from engaging state with gear mechanism 604 as aforesaid, first gear 604c is rocked a little in the counterclockwise direction by the clockwise turning force of driving lever 601 given by slider 123b. Consequently, the second gear 604e finally rocks in the opposite or clockwise direction, accompanying the counterclockwise rocking of first gear 604c, so that second gear 604e becomes engaged with gear 302a of central pulley 302. Central pulley gear 302a rotates independently of the tape run to serve, in a way, as the driving source for the automatic reverse action as is the case with the automatic shut-off operation. Central pulley gear 302a has its rotation transmitted to gear mechanism 604 to give a turn to second gear 604e, thereby shifting reverse driving lever 601 from the position of FIG. 6A to the position of FIG. 6B. That is, reverse driving lever 601 is shifted from the first position to the second position. Hereupon, when the gear ratio of the gear mechanism 604 is set at a suitable value, the notch 604b of second gear 604e again comes to face central pulley gear 302a at a point of time when reverse driving lever 601 is shifted to the second position. This restores the original state in which two gears 604e and 302a do not engage with each other. FIGS. 7A and 7B show initial and last stages of rocking of driving lever 601 toward the first position.

Thus, when reverse driving lever 601 is shifted to the second position, reproducing slider 123b, which has so far been arrested by the left end of reverse driving lever 601 through its downward strip 123b-4 is allowed to penetrate, providing the leftward or reverse playback state as shown in FIG. 6B. In this case, accompanying the shift of reverse driving lever 601 from the first position to the second position, right reproducing slider 125b, which has so far been penetrating, has its downward engaging portion 125b-2 thrust by one right end of reverse driving lever 601 to be pushed back in the downward direction, as illustrated, to the stand-by position. Thereupon, control member 27, which has so far been in a hooked end portion 123b-1 of left reproducing slider 123b which is then allowed to advance, is released and turned clockwise around its pivot point by a spring 27a. Accordingly, left take-up pulley 305 attached to a free end of control member 27 is brought in touch with left reel holder 20, thereby enabling the aforesaid leftward or reverse playback operation.

When the tape end is reached in such reverse playback state, the detecting portion of automatic tape stop detecting mechanism 500 operates again, so that the playback direction is switched from reverse to forward (FIG. 6A). Thereafter, the forward-reverse playback operations will be repeated any number of times unless the magnetic reproducing apparatus is stopped by operating STOP control switch 121.

The above-mentioned automatic reverse operation of the so-called full-mechanical type may be achieved by means of forward-reverse switching mechanism 600 of the normal-speed system including reverse driving lever 601 for directly switching the playback state between forward and reverse and reverse gear mechanism 604 cooperating therewith. The turning force of motor 23 as an essential switching driving force for the magnetic reproducing apparatus is selectively transmitted through central pulley gear 302a to operate reverse driving lever 601, thereby bringing one reproducing slider 123b or 125b into the driving state and setting the other reproducing slider 125b or 123b at the stand-by to attain the first and second positions. The automatic reverse system is, so to speak, of a 2-PLAY-button type, i.e., it can perform the ordinary one-way playback in an optional direction.

Now there will be described a preference mechanism for giving preference to the rightward run when the R-PLAY and F-PLAY buttons 123 and 125 are operated simultaneously. As already described, this preference operation may be achieved by fixedly setting the off-state position of reverse driving lever 601. Namely, it depends on the positional relation between normal-speed forward-reverse switching mechanism 600 including reverse driving lever 601 and gear mechanism 604 coacting therewith and an assembly of a leaf power switch 701 and a switch slider 702, as shown in FIG. 4, FIG. 6A and FIG. 6B. Switch slider 702, driven engagedly with all the control rods except STOP and PAUSE rods 121a and 127a, tends to close leaf power switch 701 to supply motor 23 with power. Then, as stated before, the automatic reverse operation is achieved by allowing the penetration of one of reproducing sliders 123b and 125b and checking the penetration of the other. When two PLAY control buttons 123 and 125 are operated at the same time, reverse driving lever 601, if in the first position as shown in FIG. 6B, will not engage with leaf power switch 701 to provide the rightward running state, since upwardly projecting end 603a of gear lock lever 603 engages with cam 604a of reverse gear mechanism 604 before left and right reproducing sliders 123b and 125b engage with reverse driving lever 601. On the other hand, if reverse driving lever 601 is in the second position as shown in FIG. 7A when the magnetic reproducing apparatus is stopped (i.e., stopped in the leftward running state), then the left end of reverse driving lever 601 is engaged with an elastic contact of leaf power switch 701. Accordingly, when switch slider 702 is returned by restoring the buttons to leave the elastic contact of leaf switch 701, the engaging end of reverse driving lever 601 is pressed down by the elasticity of the elastic contact of switch 701 to maintain the power on until the first position of FIG. 7B is restored. Thus, whenever two PLAY buttons 123 and 125 are operated simultaneously, the rightward run is given preference.

Such preference mechanism enables reasonable operation without contradicting any prior conditions, since the tape is usually loaded for the rightward or forward run, and two PLAY buttons 123 and 125 are usually operated simultaneously for the automatic reverse operation. Moreover, such preference mechanism, requiring not a single additional part, does not utilize the force of inertia of the flywheel or the like, so that preference operation may easily be secured without increasing the flywheel in size.

Although only the reproducing or playback operation has been described in connection with the automatic reverse action, it is to be understood that reciprocative recording with automatic reverse function may be achieved by operating REC button 124 along with both R-PLAY and F-PLAY buttons 123 and 125.

In executing such automatic reverse recording, it is rather inadvisable to repeat the operation, unlike the case of the automatic reverse playback. That is, in the automatic reverse recording, the frequency of reversal should preferably be limited by the number of tracks being used for recording.

Figure 5C:
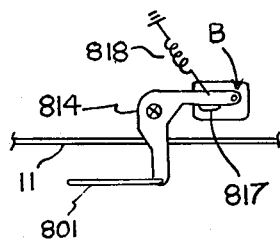
FIG. 5C is a side view in section showing the switching mechanism of reverse frequency.

Such limitation of the frequency of reversal may be required not only in recording but in playback operations. That is, in certain situations only one-reciprocation playback is desired. In addition, there are some cases where automatic playback is required to continue for only one more repetition after repeated operations. Thus, there is needed a reverse frequency limiting mechanism for limiting the number of times of automatic reverse action by means of external operation, as required. Accordingly, there will now be described the reverse frequency limiting mechanism provided for such purpose referring to FIGS. 5A to 5C. Control switch 24 is arranged so as to be rocked in the clockwise direction around its pivot point (shown in FIG. 4). A substantially L-shaped limit lever 814 is rocked around its pivot point in the direction of arrow B through a wiry rod 801 in response to the operation of control switch 24 as shown in FIG. 5C. This causes a lever 817 to be rocked in the direction towards lock plate 800 against a biasing force of a spring 818 connected between lever 817 and chassis 11. Lever 817 has two projections 815 and 816 as shown in FIG. 5A. In the rocking state of lever 817 towards lock plate 800, projection 815 is engagable with the other end of L-shaped lever 810b. On the other hand, projection 816 is engagable with select lever 509 of automatic tape stop mechanism 500 rocked by gear lock lever 603. As a result, select lever 509 pushes projection 816 together with reverse lever 605 (FIG. 4) and rocks lever 817 in the direction towards L-shaped lever 816b against the biasing force of spring 818. Then, projection 815 rocks L-shaped lever 810b against the biasing force of spring 813b. This causes F-PLAY control rod 125a to be released from its state locked to locking portion 808 formed on one end of L-shaped lever 810b. Further, reverse lever 605 is rocked clockwise by releasing slider 507. This causes gear lock lever 603 to be rocked counterclockwise against tension spring 602. Therefore, select lever 509 turns to a position facing lock releasing portion 130. Accordingly, automatic tape stop detecting mechanism 500 performs automatic shut-off operation at the time when the tape end is reached in playback or recording of the other track. Thus, the playback or recording operation is sure to be performed for only one reciprocation.

Accordingly, double or further wrong recording (mistake erasure) may be prevented, and, also in playback operation, the frequency of reverse can be limited. Since the reverse frequency limiting mechanism for this purpose can be obtained by only adding the simple mechanism to the full-mechanical system, it may suitably be used as an attachment to the automatic reverse system. That is, the reverse frequency may be limited both in recording and in playback only when switch 24 of the reverse frequency limiting mechanism is operated. In other words, the automatic reverse operation can be continued endlessly even in recording, unless switch 24 is operated. Such operation may be effectively applied to a case where only up-to-date information is to be recorded. Accordingly, time-limited and endless automatic reverse operations may be used properly according to various applications. Moreover, this reverse frequency limiting mechanism can achieve its function even when manual reverse control lever 25 is operated, that is, in the middle of manual reverse operation. In any case, the magnetic reproducing apparatus would be stopped finally in the same pattern of process, such as rightward→leftward→stop, or leftward→rightward leftward→stop (when a R-PLAY button 123 is operated with priority), so that the current functional condition can easily be identified.

Now there will be described a manual reverse control mechanism. The mechanism reverses the direction of tape run at an optional point of time without waiting for the tape end to be reached and without operation of automatic tape stop detecting mechanism 500. This manual reverse control mechanism provides various alternatives for the actual use of the automatic reverse system. For example, on the way of reproducing one track of a tape in automatic reverse operation mode, the magnetic reproducing apparatus may be switched to reproduce the other track without reproducing the remaining portion of the same track. Further, when the tape end, leader, or timing tape is reached, tape-recording is stopped until the manual reverse control is activated. When an available track reaches the recording head after manual reversal, recording continues. Such awkward situation can, however, be avoided by previously switching the mechanism to the other track. The manual reverse control mechanism causes normal-speed forward-reverse switching mechanism 600 to be operated at an optional point in time in the same manner as the detecting portion of automatic tape stop detecting mechanism 500. Therefore, it is required only that gear lock lever 603 as shown in FIG. 4 be released from the engagement with cam portion 604a of reverse gear mechanism 604. Pulling control lever 25 in the direction of arrow a causes gear lever 603 to rock in the counter-clockwise direction by means of a wiry rod 802 connected between control lever 25 and one end of gear lock lever 603. This causes gear lock lever 603 to be released from the engagement with cam portion 604a. Thus, the direction of tape run may securely be reversed with ease at an optional point in time.

Figure 8A:
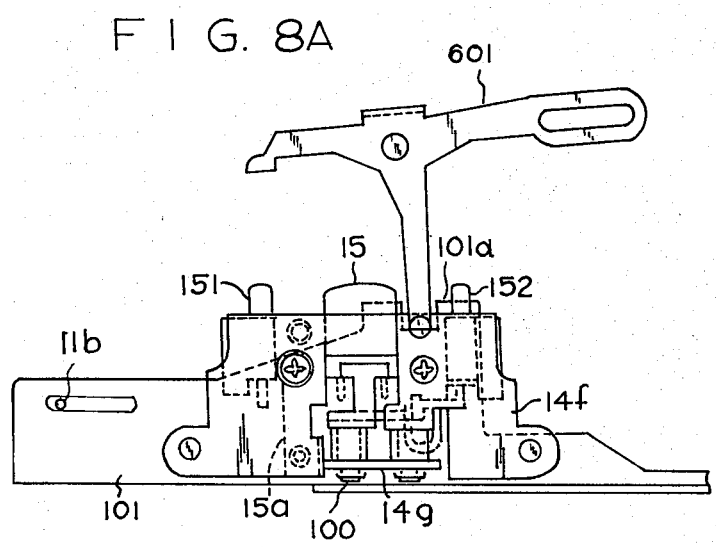
FIGS. 8A to 8H are plan views showing varied operating states of a head shift mechanism as viewed from various angles.
Figure 8B:
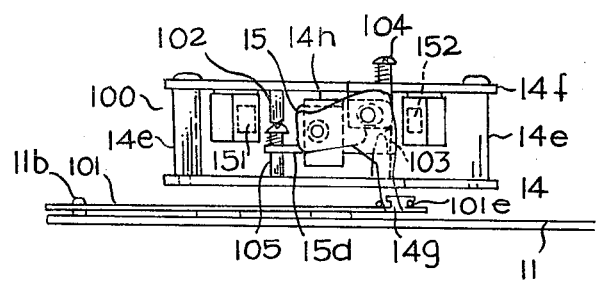
Figure 8C:
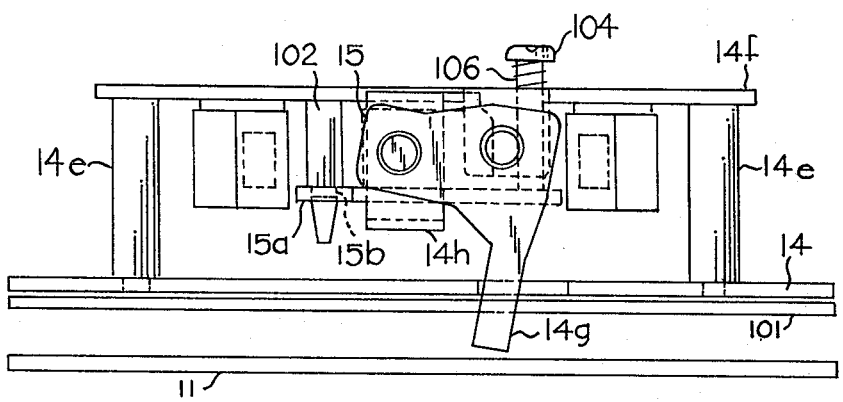
Figure 8D:
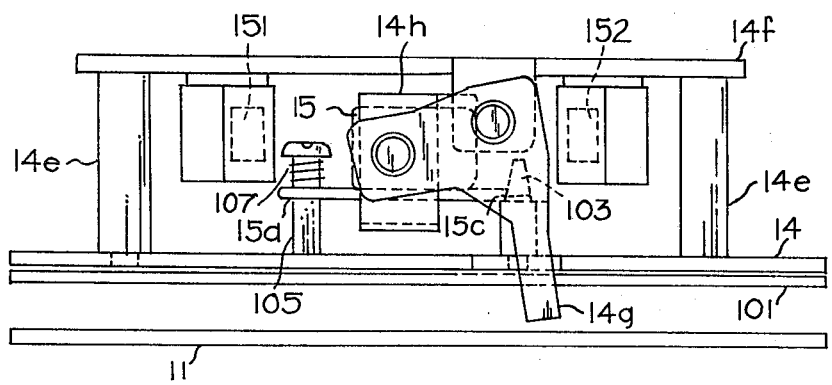
Figure 8E:
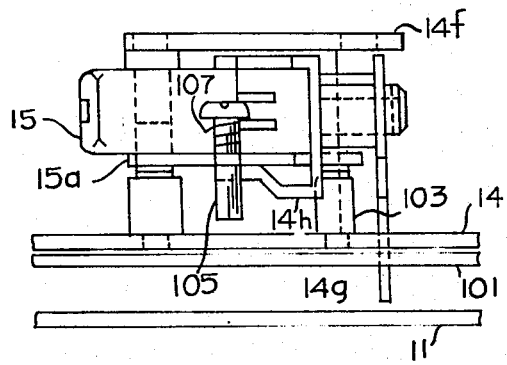
Figure 8F:
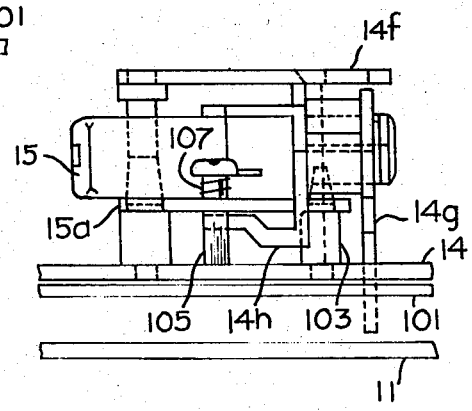
Figure 8G:
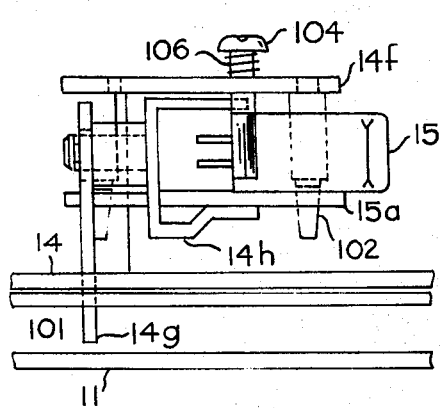
Figure 8H:
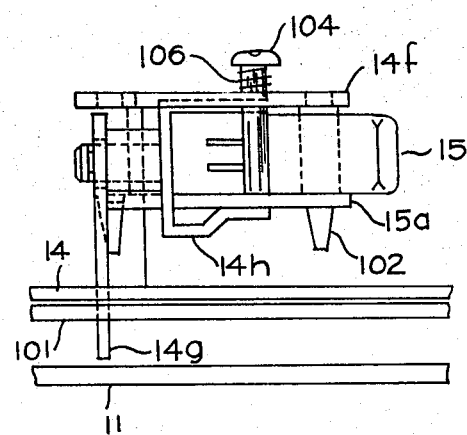

Now there will be described a head control mechanism 100. As shown in FIGS. 8A and 8B, there is provided a head switching slider 101. Slider 101 is allowed to slide in the horizontal direction guided by a pair of guide pins 11b on chassis 11 as illustrated. Slider 101 takes a right-hand or left-hand position corresponding to the first or second position of reverse driving lever 601, with a recess 101a formed at its tip end engaging with the bottom end of reverse driving lever 601 of normal-speed forward-reverse switching mechanism 600. Here, head switching slider 101 has no direct connection with head slider 14. As shown in FIG. 8B, a head mount plate 14f, having erasure heads 151 and 152 on each end thereof, is fixed in parallel to head slider 14 by means of a proper number of supports 14e. In front of mount plate 14f, there is an L-shaped head switching lever 14g pivotally mounted at right angles to plate 14f. One end of lever 14g is engagedly attached between two wiry engaging members 101e protruding from and supported by the forward end of head switching slider 101. Therefore, a horizontal slide of head switching slider 101 raises a vertical shift of recording reproducing head 15 through a head holding member 14h having a substantially U-shaped side face. Head holding member 14h is loosely fitted with the other end or backwardly extending portion of head switching lever 14g. These members are independent of the horizontal sliding system including head slider 14. The head holding member 14h holds at its one end recording-reproducing head 15 through a head base 15a for supporting head 15. In this case, as shown in FIGS. 8C and 8D, two pairs of upper and lower receiving pins 102 and 103 extend downwardly from head mount plate 14f and upwardly from head slider 14. In addition, a pair of upper and lower azimuth adjusting screws 104 and 105 engage with head base 15a. As a result, a vertical shift position is located, and upper and lower azimuths are set for optimum results. Upper and lower receiving pins 102 and 103 each have a tapered tip end and a stepped portion between the tip end and the basic portions, putting in holes 15b of head base 15a to move head base 15a properly in the vertical direction and to locate the vertical position. Upper and lower azimuth adjusting screws 104 and 105 tend independently to adjust by means of springs 106 and 107 the upper and lower azimuths of recording-reproducing head 15 to their respective optimum states, through head base 15a. FIGS. 8C and 8D show cases where recording-reproducing head 15 is shifted upward and downward to feed the tape leftward and rightward with reverse driving level 601 in the first and second positions, respectively. Further, FIGS. 8E and 8F show, respectively, midway and stop positions during and after rightward tape feed in which recording reproducing head 15 is moved downward, while FIGS. 8G and 8H show, respectively, the midway and stop positions during and after leftward tape feed in which head 15 is moved upward.

According to the aforementioned head shift mechanism, the azimuths may be independently adjusted in advance correspondingly to the time lag in reciprocative tape run, requiring no special or extraordinarily expensive recording reproducing head. In a conventional-type head shift mechanism, the azimuth adjustment is made by using a solenoid plunger, which cannot eliminate the unsteadiness of head on either side. That is, despite the 3-point adjusting system, such mechanism is subject to flapping or unsteadiness because it involves only coplanar engagement. With the construction of this invention, however, head base 15a is 3-point supported by means of two taper pins and one azimuth adjusting screw on each side, so that head is stable without suffering flapping. Moreover, since the taper pin is fitted in the engaging hole 15b of the head base 15a for positional restriction, the unsteadiness on both right and left sides of the head can be eliminated.

In head control mechanism 100, pair of erasure heads 151 and 152 themselves are fixed on plate 14f and each head face corresponds to the upper or lower position. It is, however, to be desired that an antinomic requirement be satisfied; the plunge of the erasure head into the tape surface must be increased and decreased in order to improve the erasure rate in the automatic reverse operation and the WOW characteristic, respectively. Accordingly, there will now be described an erasure head plunge control mechanism to meet such requirement.

Figure 9A:
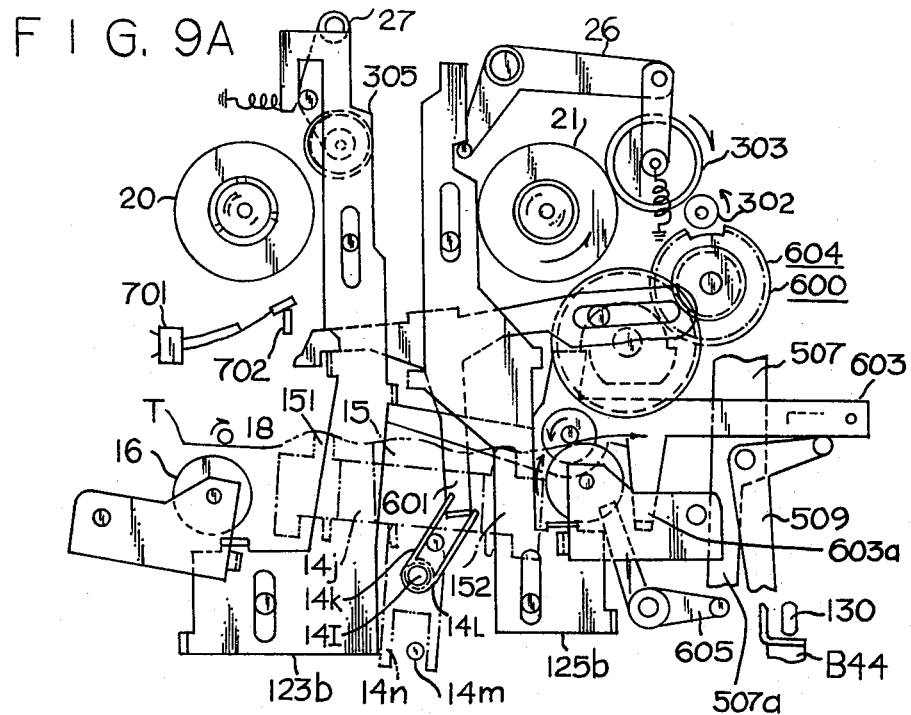
FIGS. 9A and 9B are plan views showing a modification of the head shift mechanism in two different states.
Figure 9B:
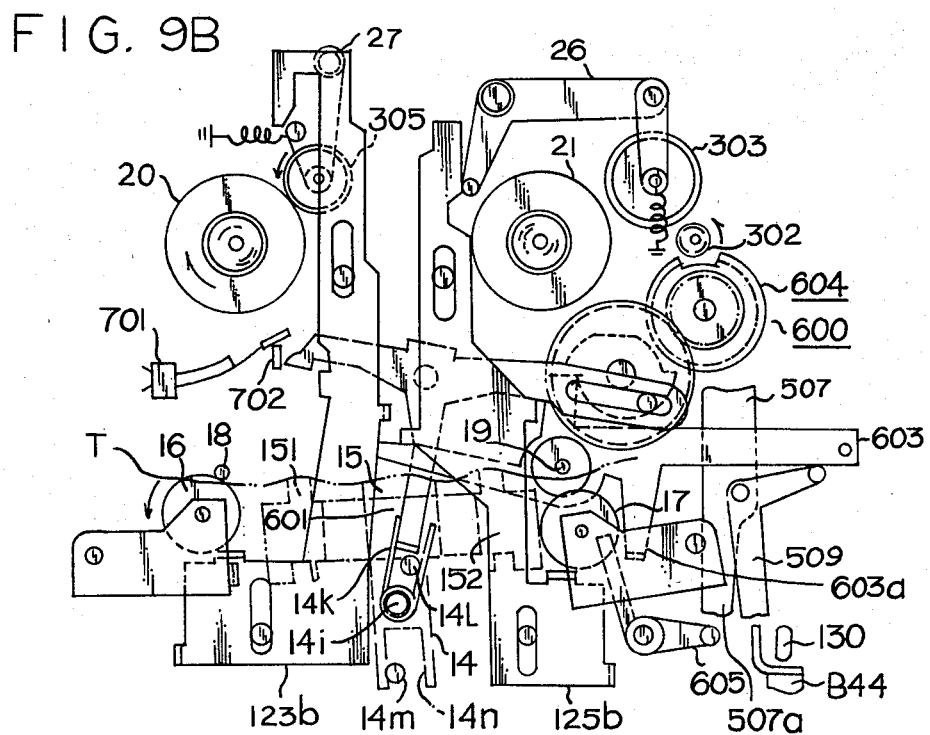

As indicated by chain lines in FIGS. 9A and 9B, there is provided a substantially T-shaped erasure head base 14j which is allowed to swing around a pin 14i between head slider 14 and head mount plate 14f. Erasure heads 151 and 152 are mounted on both ends of the top of the erasure head base 14j, respectively. A spring 14k has its central portion engaged with pin 14i and two ends extending substantially in parallel with each other. Spring 14k engages at its extending portion with the bottom end of reverse driving lever 601. Thus, erasure head base 14j is turned clockwise (FIG. 9A) or counterclockwise (FIG. 9B) correspondingly to the first and second positions of reverse driving lever 601, without regard to head slider 14 and head mount plate 14f. Therefore, the plunge of erasure heads 151 and 152 is smaller on the trailing side than on the leading side as viewed from recording reproducing head 15. That is, the erasure rate may be improved by setting the plunge of left erasure head 151 larger than that of right erasure head 152 by a predetermined amount, and the WOW characteristic may be improved by reducing the load on the trailing side which may be an essential cause of WOWS, at time of rightward feeding. Similar but contrary effects may be obtained for the case of leftward feeding. Numeral 14l of FIGS. 9A and 9B designates a stopper engaging with spring 14k to restrict the swing of erasure head base 14j, while 14m denotes an engaging member which engages with a recess 14n formed on the bottom end of erasure head base 14j, and is fixed to slide head switching slider 101 in the horizontal direction. If earsure head base 14j is designed with a wide swing so as to allow the no-use erasure head to retract over a substantial distance, it will be possible to use a magnetic erasure head which may be lower in price than an AC-type erasure head.

Figure 10:
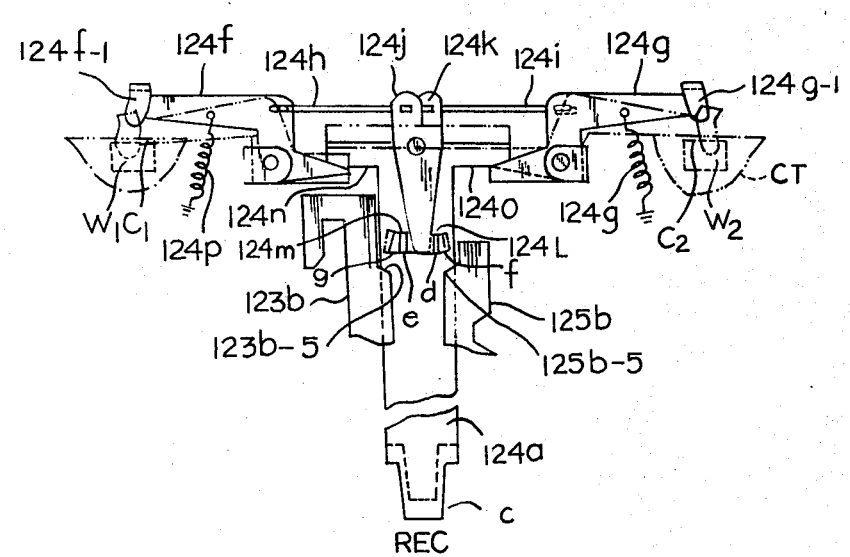
FIG. 10 is a plan view showing a wrong erasure preventive mechanism of the magnetic reproducing apparatus.

Now there will be described a wrong erasure preventive mechanism. FIG. 10 shows the wrong erasure preventive mechanism extracted from FIG. 1. Formed on control rod 124a of REC button 124 are stopper portions 124n and 124o projecting to the left and right at its backward end portion. Swingably provided are substantially crank-shaped left and ring claw detection levers 124f and 124g each having one end engaged with each of stopper portions 124n and 124o. Counterclockwise and clockwise biasing forces are applied to detection levers 124f and 124g by springs 124p and 124q, respectively. These detection levers 124f and 124g are connected to alternately rockably supported left and right recording prevention levers 124j and 124k at one end thereof by means of wiry rods 124h and 124i, respectively. Also, there are provided stopping members 124l and 124m capable of swinging to the right and left on the other ends of recording prevention levers 124j and 124k. Here, stopping members 124l and 124m correspond to stopper portions 125b-5 and 123b-5 on right and left reproducing sliders 125b and 123b, respectively. W1 and W2 designate a pair of detection windows formed at rear portions of the case of a cassette tape CT. When REC button 124 is operated to thrust its rod 124a into a position as indicated by chain lines C, left and right claw detection levers 124f and 124g, which thus far have been engaged with stopper portions 124n and 124o of rod 124a and accordingly have been positionally restricted, are allowed to swing in the directions of the respective biasing forces to which they are subject. The respective one ends 124f-1 and 124g-1 of detection levers 124f and 124g are induced to penetrate their corresponding detection windows W1 and W2 of cassette tape CT. If detection windows W1 and W2 are closed with the so-called wrong erasure prevention claws C1 and C2, these ends are prohibited from penetration. If such wrong erasure prevention claws are cut off, however, the ends are allowed to penetrate the windows W1 and W2, so that the swing range is extended. Then, left or right recording prevention lever 124j or 124k, to which the extended swing is transmitted by means of wiry rod 124h or 124i, is rocked. Therefore, that stopping member 124l or 124m is moved from a position indicated by the full lines d and e to a position indicated by the broken lines f and g. Accordingly, the stopper portion 123b-5 or 125-5 of left or right reproducing slider 123b or 125b hits against shifted stopping member 124m or 124l. One or both of sliders 123b and 125b are prevented from penetration (no claws) or allowed to penetrate (claws entire) by the position of left and right recording prevention levers 124j and 124k. In any case, recording or wrong erasure may be avoided on a side or sides of the tape by means of the wrong erasure prevention claws on the cassette.

Unlike the conventional wrong erasure prevention means, REC button 124 of the magnetic reproducing apparatus of this invention can be operated at any time irrespective of the existence of the wrong erasure prevention claws, and a PLAY button or switches cannot be operated when a cassette has no claws on a side or sides. Accordingly, recording may be achieved on a cassette tape with a single claw by reversely feeding the tape without invertedly loading it. Further, R-PLAY and F-PLAY buttons 123 and 125 are arranged on each side of REC button 124, so that the correspondence with the cassette tape can be easily be understood for facilitating operation. In addition, the wrong erasure preventive mechanism may be formed in a symmetrical shape, which is advantageous in both design and manufacture (especially in die molding, etc.).

Moreover, in the above-mentioned wrong erasure preventive mechanism, detection levers 124f and 124g are withdrawn when the magnetic reproducing apparatus is stopped. Therefore, the cassette tape may be easily be loaded and unloaded. This holds true also in a case where the ordinary wrong erasure prevention is to be made by employing half of the aforesaid mechanism. Also in this case, a high degree of freedom in design is secured, affording special facility for upright-type magnetic reproducing apparatus.

Figure 11A:
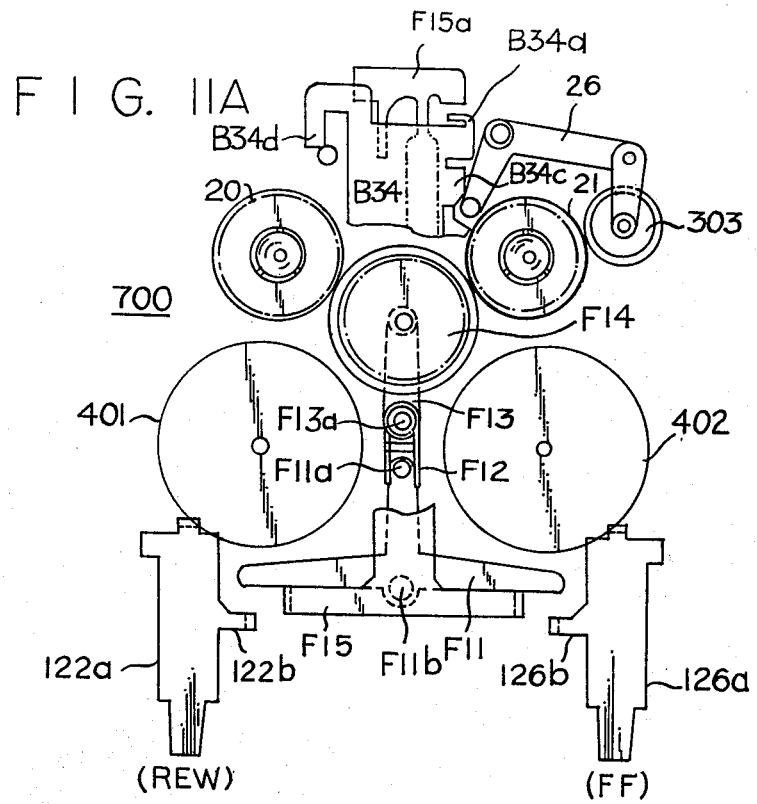
FIGS. 11A and 11B are plan views showing a high-speed forward-reverse switching mechanism section of the tape recorder in two different states.
Figure 11B:
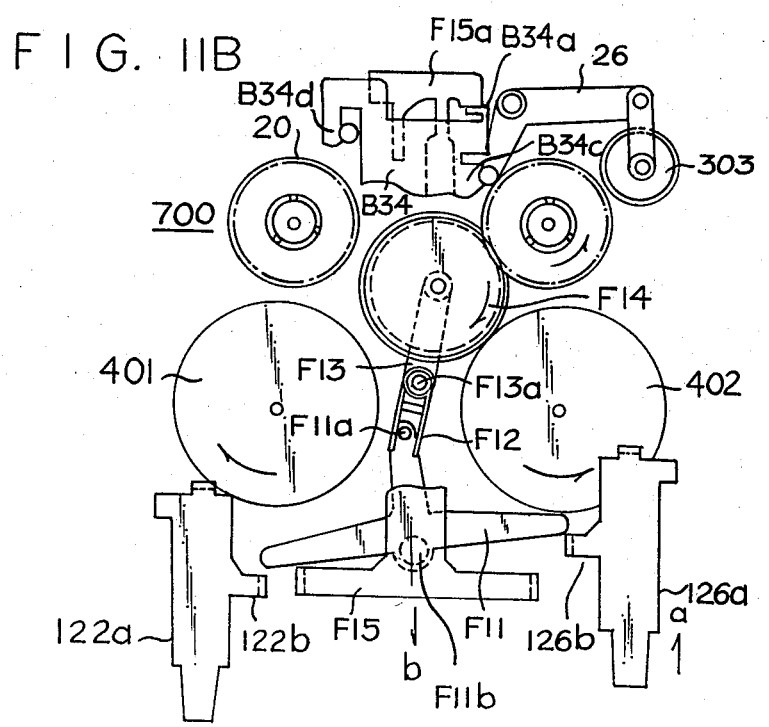

Now there will be described forward-reverse switching mechanism 700 of the high-speed tape feed system. FIG. 11A shows the high-speed forward-reverse switching mechanism portion extracted from FIGS. 1 and 2. Respective control rods 122a and 126a of REW button 122 and FF button 126 have engaging portions 122b and 126b protruding from the inside thereof, respectively. Between these rods 122a and 126a is a substantially inverted-T-shaped switch lever F11 supported swingably and having each end engageable with engaging portions 122b and 126b. A pin F11a protruding from the top end of switch lever F11 is interposed between two leg portions of a spring mechanism F12. Spring mechanism F12 is supported on a pivot point F13a of an idler supporting lever F13 at the middle portion of spring mechanism F12. In addition, the two leg portions of spring mechanism F12 extend on opposite sides of one end of lever F1. The other end of idler supporting lever F13 is fitted with a high-speed idler F14 located between the pair of flywheels 401 and 402 as well as between reel holders 20 and 21. Idler F14 causes selectively one flywheel 401 to engage with one reel holder 20 or the other flywheel 402 to engage with the other reel holder 21, respectively through idler F14. When rod 126a of FF button 126 is thrust as indicated by arrow a in FIG. 11B, for example, engaging portion 126b engages with its corresponding end of switch lever F11 so that lever F11 swings counterclockwise around its pivot point F11b. In this condition, idler supporting lever F13 is rocked clockwise around its pivot point F13a by means of spring mechanism F12, so that high-speed idler F14 is brought into contact with both right flywheel 402 and right reel holder 21. As a result, the high-speed feeding or fast forwarding in the rightward direction is effected. F-PLAY button 126 can be operated during playback operation in either direction. When switch lever F11 swings, its one end engages with a retreating slider F15, thereby pushing back slider F15 in the direction of arrow b in FIG. 11B. As a result, a tip end engaging portion F15a of retreating slider F15 pushes back slightly downward as shown in FIG. 11B an engaging portion B34a of a slider B34 mounted on head slider 14. Hereupon, the action of slider B34 has been thrusting to a position allowing idler 303 to engage with right reel holder 21 as indicated in FIG. 11A, causes idler 303 to be released from right reel holder 21 as indicated in FIG. 11B. Therefore, the so-called cue operation is effected. If rod 122a of REW button 122 is operated independently or in combination with R-PLAY button 123, rewinding or review state may be obtained by performing operation opposite to the aforementioned processes.

Figure 12:
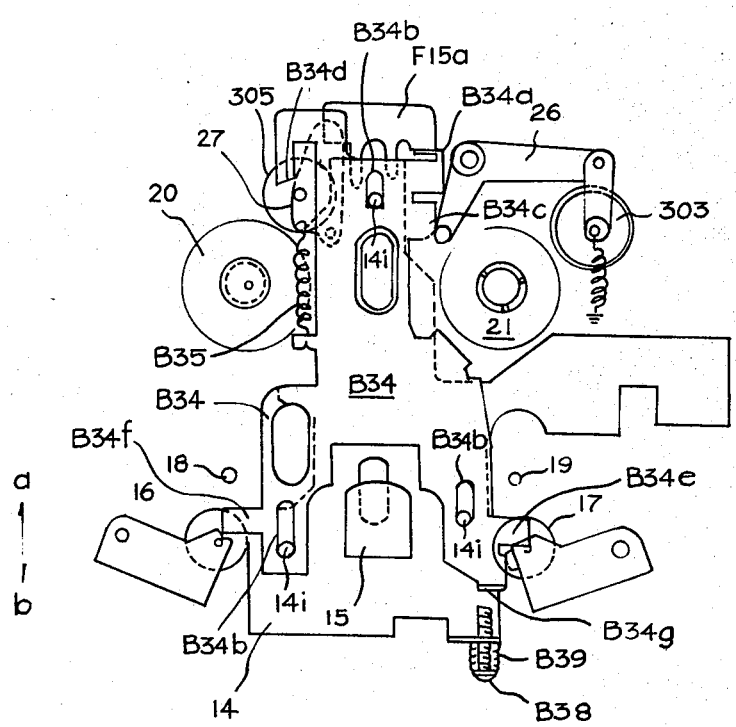
FIG. 12 is a plan view showing a pulling out mechanism section of normal speed reproducing system according to a high-speed tape feed system.
Figure 13:
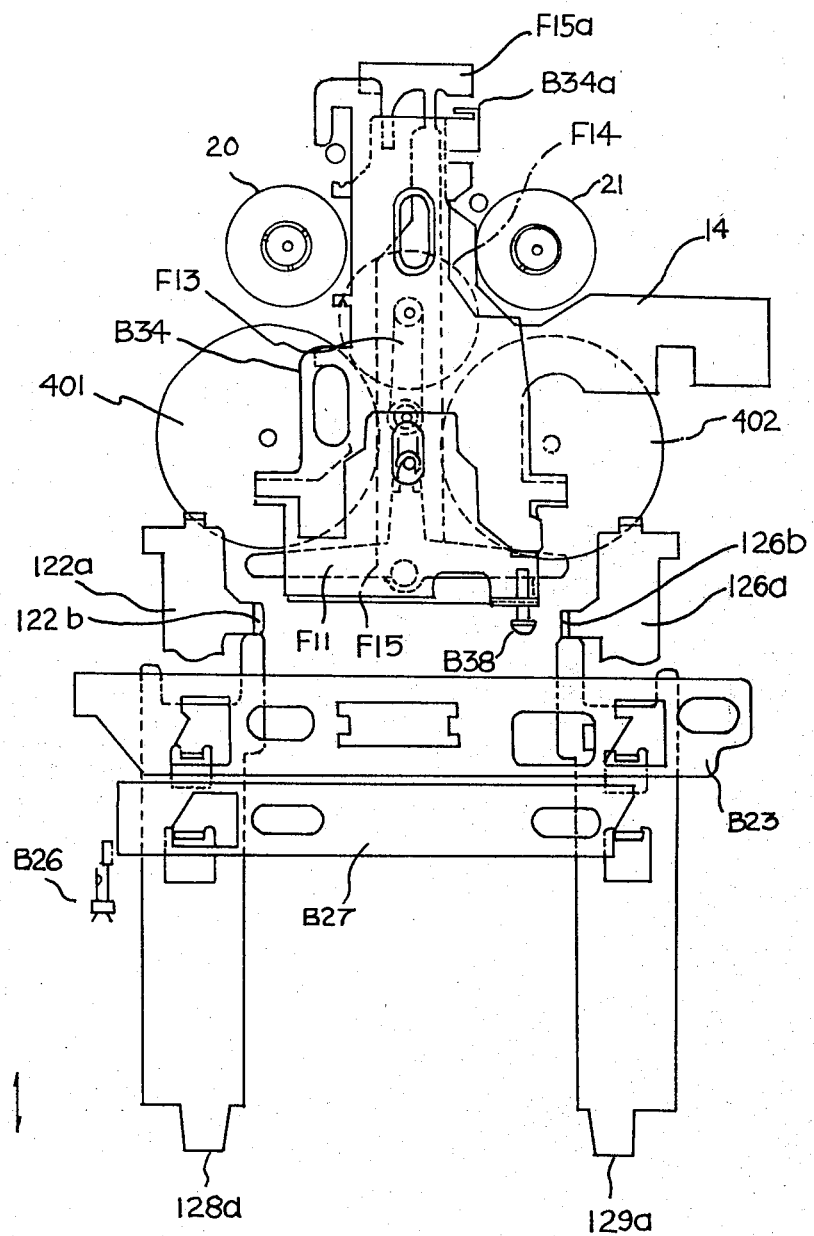
FIG. 13 is a plan view showing a high speed searching mechanism section of the magnetic reproducing apparatus.

Now there will be described the operation of slider B34 referring to FIG. 12. Slider B34 pulls out the normal speed reel driving system 300 and capstan driving system 400 from their operating condition and makes head 15 to move back a little, at the time when one of REW and FF control rods 128a and 129a is operated. That is, slider B34 is slidably mounted on head slider 14 by means of engagement with guide pins 14i on head slider 14 and slots B34b of slider B34. Further, slider B34 is biased in the direction of arrow a by a spring B35 connected between slider B34 and head slider 14. As a result, slider B34 is located with head slider 14 in the upwards position engagable with engaging portion F15a of retreating slider F15 during one or both of PLAY buttons 123 and 125 being operated. When one of REW and FF control rods 122a and 126a is operated at the above-mentioned condition, slider B34 is pushed back in the direction of arrow b against the biasing force of spring B35. Therefore, a right projection B34C protruding rightwardly from right side top portion of slider B34 or a left projection B34d protruding downwardly from left side top portion of slider B34 pulls out right take-up idler 303 or left take-up pulley 305 from respective engaging state with right reel holder 21 or left reel holder 20. In addition, a projection B34e protruding rightwardly from right side bottom portion of slider B34 or a projection B34f protruding leftwardly from left side bottom portion of slider B34 also pulls out right pinch roller 17 or left pinch roller 16 from respective engaging state with right capstan 19 or left capstan 18. As a result, during the cue or review operation, the normal speed driving system 300 and capstan driving system 400 are stopped. Moreover, a projection B34g at the bottom portion of slider B34 pushes back head slider 14 a little in the direction of arrow b by means of projection B34g attaching to a screw B38 mounted to a bottom portion of head slider 14. Therefore, head 15 on head slider 14 moves back a little. This causes head 15 to be slightly touched with the tape running in high speed. The moving distance of head slider 14 pushed back by slider B34 is adjustable in proper amount by adjusting screw B38 in or out. Now, a spring B39 shown in FIG. 12 prevents a loosening of screw B38.

In such forward-reverse switching mechanism of the high-speed tape feed system, the mechanisms including the control switches are bisymmetric, and one and the same high-speed idler is used for both fast feeding and rewinding, thereby minimizing the number of positions that require control. Whereas in prior art magnetic reproducing apparatus of this type two exclusive-use switch levers are respectively used for cue and review operations, this invention requires only a single switch lever, as already mentioned. Moreover, the use of the single switch lever prevents such wrong operation as to operate the REW button at the same time, so that the tape as well as the mechanism may be protected.

Now there will be described the features and advantages of the control mechanism portion capable of the aforementioned automatic reverse function. As already described in connection with FIG. 1 and other drawings, the R-PLAY and F-PLAY buttons 123 and 125 are arranged on both sides of REC button 124 respectively. In addition, REW and FF buttons are disposed on each outer side of PLAY buttons 123 and 125. Thus, the high-speed forward-reverse switching mechanism and the wrong erasure preventive mechanism may be formed bisymmetric, providing facilities for operation as well as for design and manufacture.

Now there will be described the unrecording block quick search mechanism portion extracted from FIG. 1. Respective control rods 128a and 129a of R-SEARCH button 128 and F-SEARCH button 129 are arranged along REW control rods 122a and FF rod 126a and locked selectively to lock plate B23. SEARCH buttons 128 and 129 move REW rod 122a and FF rod 126a in the direction of arrow a respectively in engagement with protruding portions 122b and 126b of REW and FF rods 122a and 126a. Thereby respective REW and FF rods 122a and 126a are locked in their operating conditions independently of the operations of R-PLAY and F-PLAY buttons 123 and 125. Accordingly, by means of operating R-SEARCH button 128 or F-SEARCH button 129 together with one or both of R-PLAY rod 123a and F-PLAY rod 125a in respective operating conditions, the aforesaid review or cue operation is effected. There is a switch control plate B27 between R-SEARCH and F-SEARCH control rods 128a and 129a. Switch control plate B27 operates an electric switch B26 connected to unrecorded block detecting circuit (not shown) when one of the R-SEARCH and F-SEARCH rods 128a and 129a is locked to lock plate B23 in ON condition. An unrecorded block detecting circuit B4 drives a plunger B41 in the direction of arrow c when a reproducing signal picked up by head 15 runs out, as shown in FIG. 14 extracted from FIG. 1. Plunger B41 may move lock plate B23 through a search operation release lever B42. Thereby SEARCH rod 128a or 129a is unlocked, but one or both of R-PLAY and F-PLAY rods 123a and 125a are maintained in operating conditions. Simultaneously, one of take-up idler 303 and pulley 305, for example, right idler 303 engages to right reel holder 21. As a result, the magnetic reproducing apparatus reproduces a recorded block of a tape from its beginning end.

Lock plate B23 may be moved so as to unlock SEARCH rod 128a or 129a by means of aforesaid tape stop detecting mechanism 500. That is, as shown in FIG. 14, there is another release lever B44 between lock plate B23 and select lever 509 mounted on releasing slider 507 of tape stop detecting mechanism 500. Release lever B44 has a projection B44a protruding along aforesaid lock plate releasing portion 130 of lock plate 800 at its one end B44b and other end B44c engagable with a projection B23h of lock plate B23. Projection B44a of release lever B44 faces to one end of select lever 509 when select lever 509 is rocked by releasing slider 507. On the other hand, one end B44b of releasing lever B44 faces to lock plate releasing portion 130 from the side opposite to select lever 509. As a result, lock plate B23 may be moved to unlock SEARCH rod 128a or 129a by either of plunger B41, automatic tape stop detecting mechanism 500 and lock plate 800.

Accordingly, the magnetic reproducing apparatus may be changed from forward or backward searching condition to a reverse playback condition of another track or repeated playback condition of the same track at the tape end.

Now there will be described those aforesaid changing operations. Searching operations changeable to the playback condition when reaching the tape end are set by means of locking either one of SEARCH rods 128a and 129a and both of PLAY control rods 123a and 125a together. In this state, the high-speed tape feed system engages with one of reel holders 20 and 21, and restrains normal-speed reel driving system 300 from engaging with one of reel holders 20 and 21. On the other hand, the automatic tape stop detecting mechanism 500 is arranged for engagement with release lever B44 and forward-reverse switching mechanism 600. Therefore, when the tape stops upon reaching the tape end, normal-speed reel driving system 300 enters into operating condition in spite of the high-speed tape feed system.

This is because the high-speed tape feed system is released from its operating condition and the restraint for normal-speed reel driving system 300 is reduced. Further, forward-reverse switching mechanism 600 enters into operation. Thereby, one of the reel holders, which is different with the reel holder driven by the high-speed tape feed system, is driven by normal-speed reel driving system 300.

It will be apparent to those skilled in the art that various modifications and variations could be made in the magnetic recording apparatus of the invention without departing from the scope or spirit of the invention.

What is claimed is:

1. A magnetic reproducing apparatus employing a cartridge tape which contains a pair of reels and a magnetic tape wound thereon and having the opposite ends thereof securely fixed to said pair of reels respectively, said apparatus comprising:

a pair of spindles to which said pair of reels is removably attached;

fast driving means for driving said spindle in one direction such that the reel held on one of said spindles winds up the tape supplied from the other reel;

slow driving means for driving the other of said spindles in the other direction such that the reel held on said other spindle winds up said tape supplied from said one reel;

means for detecting stoppage of a tape running between said reels; and means for releasing said fast driving means out of operation and setting said slow driving means into operation in response to said detecting means.

2. A magnetic reproducing apparatus according to claim 1 wherein said fast driving means selectively drives either of said spindles in opposite directions from each other.

3. A magnetic reproducing apparatus according to claim 2 further comprising:
means for changing the operating condition of said slow driving means between two conditions driving said spindles in opposite directions; and
means for operating said changing means in response to said detecting means for causing said slow driving means to drive said spindle in the opposite direction from spindle driven by said fast driving means before stoppage of the tape.

4. A magnetic reproducing apparatus according to claim 3 wherein said slow driving means comprises a pair of driving means respectively associated with said spindles and being selectively operated.

5. A magnetic reproducing apparatus according to claim 4 further comprising:
first means for selectively controlling either of said pair of slow driving means in operating condition or non-operating condition;
second means for selectively controlling said fast driving means in operating condition or non-operating condition;
means for restraining said first controlling means from causing said slow driving means to operate when said second controlling means controls said fast driving means in operating condition; and wherein,
said releasing and setting means releases said restraining means in response to said detecting means for allowing said slow driving means to be operated.

6. A magnetic reproducing apparatus according to claim 5 further comprising:
first means for locking said second controlling means into the operating condition, and for locking said restraining means into a condition wherein said slow driving means is prevented from operating; and wherein,
said releasing and setting means unlocks said locking means in response to said detecting means, for switching said fast driving means into the non-operating condition and one of said slow driving means into operating condition.

7. A magnetic reproducing apparatus according to claim 6 further comprising:
second means for locking said first controlling means into a first position wherein one of said slow driving means is in the operating condition and said fast driving means is in the non-operating condition, and a second position wherein one of said slow driving means is restrained from operating and said fast driving means is in the operating condition.

8. A magnetic reproducing apparatus according to claim 7 further comprising:
first means for actuating said second controlling means for causing said fast driving means to operate.

9. A magnetic reproducing apparatus according to claim 8 wherein:
said first actuating means has two states, one said state causing said fast driving means to drive one spindle and the other said state causing said fast driving means to drive the other spindle.

10. A magnetic reproducing apparatus according to claim 9 also including:
second means for actuating said first controlling means for causing one of said slow driving means to operate.

11. A magnetic reproducing apparatus according to claim 10 wherein:
said second actuating means has two states, one state causing one of said slow driving means to drive one spindle and other state causing said the other slow driving means to drive said other spindle.

12. A magnetic reproducing apparatus according to claim 7 further comprising:
third means, separate from said first locking means, for locking said second controlling means in operating condition; and wherein,
said third locking means is prevented from locking said second controlling means in operating condition when said second locking means is locking said first controlling means in operating condition.

13. A magnetic reproducing apparatus according to claim 12 further comprising:
first means for actuating said second controlling means for causing said fast driving means to operate.

14. A magnetic reproducing apparatus according to claim 13 wherein:
said first actuating means has two states, one said state causing said fast driving means to drive one spindle and the other said state causing said fast driving means to drive the other spindle.

15. A magnetic reproducing apparatus according to claim 14 also including:
second means for actuating said first controlling means for causing one of said slow driving means to operate.

16. A magnetic reproducing apparatus according to claim 15 wherein:
said second actuating means has two states, one state causing one of said slow driving means to drive one spindle and other state causing said the other slow driving means to drive said other spindle.

17. A magnetic reproducing apparatus according to claim 16 wherein:
said first actuating means includes a pair of impeller means, one of said impeller means being associated with said first locking means and the other being associated with said third locking means.

18. A magnetic reproducing apparatus according to claim 17 wherein:
said third locking means locks said first actuating means for causing said second controlling means and said restraining means to be locked in operating condition.

19. A magnetic reproducing means according to claim 18 wherein:
one of said impeller means associated with said first locking means impels said second controlling means and said restraining means in respective operating conditions through said other impeller means associated with said third locking means.

20. A magnetic reproducing apparatus according to any one of the claims 1 to 3 further comprising:
first means for controlling said slow driving means in operating condition or non-operating condition;

second means for controlling said fast driving means in operating condition or non-operating condition;

means for restraining said first controlling means from causing said slow driving means to operate when said fast driving means is operating; and wherein, said releasing and setting means releases said restraining means in response to said detecting means for allowing said slow driving means to operate.

21. A magnetic reproducing apparatus according to claim 4 further comprising:

first means for locking said second controlling means into the operating condition, and for locking said restraining means into a condition wherein said slow driving means is prevented from operating; and wherein said releasing and setting means unlocks said first locking means in response to said detecting means, for switching said fast driving means into non-operating condition and said slow driving means into operating condition.

22. A magnetic reproducing apparatus according to claim 21 further comprising:

second means for locking said first controlling means into a first position wherein said slow driving means is in the operating condition and said fast driving means is in the non-operating condition, and a second position wherein said slow driving means is restrained from operating and said fast driving means is in the operating condition.

23. A magnetic reproducing apparatus according to claim 22 further comprising:

first means for actuating said second controlling means for causing said fast driving means to operate.

24. A magnetic reproducing apparatus according to claim 23 wherein said first actuating means has two states, one said state causing said fast driving means to drive one spindle and the other said state causing fast driving means to drive the other spindle.

25. A magnetic reproducing apparatus according to claim 24 also including second means for actuating said first controlling means for causing said slow driving means to operate.

26. A magnetic reproducing apparatus according to claim 22 further comprising:

third means, separate from said first locking means, for locking said second controlling means in operating condition; and wherein, said third locking means is prevented from locking said second controlling means in operating condition when said second locking means is locking said first controlling means in operating condition.

27. A magnetic reproducing apparatus according to claim 26 further comprising:

first means for actuating said second controlling means for causing said fast driving means to operate.

28. A magnetic reproducing apparatus according to claim 27 wherein said first actuating means has two states, one said state causing said fast driving means to drive one spindle and the other said state causing said fast driving means to drive the other spindle.

29. A magnetic reproducing apparatus according to claim 28 also including second means for actuating said first controlling means for causing said slow driving means to operate.

30. A magnetic reproducing apparatus according to claim 29 wherein:

said first actuating means includes a pair of impeller means, one of said impeller means being associated with said first locking means and the other being associated with said third locking means.

31. A magnetic reproducing apparatus according to claim 30 wherein:

said third locking means locks said first actuating means for causing said second controlling means and said restraining means to be locked in operating condition.

32. A magnetic reproducing means according to claim 31 wherein:

one of said impeller means associated with said first locking means impels said second controlling means and said restraining means in respective operating conditions through said other impeller means associated with said third locking means.

* * * * *